United States Patent
Imafuku

(10) Patent No.: US 10,124,669 B2
(45) Date of Patent: Nov. 13, 2018

(54) TRANSFER FOR FOUR-WHEEL DRIVE VEHICLE

(71) Applicant: TOYOTA JIDOSHA KABUSHIKI KAISHA, Toyota-shi, Aichi-ken (JP)

(72) Inventor: Mizuki Imafuku, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 15/331,148

(22) Filed: Oct. 21, 2016

(65) Prior Publication Data

US 2017/0113545 A1 Apr. 27, 2017

(30) Foreign Application Priority Data

Oct. 26, 2015 (JP) ................................ 2015-210272

(51) Int. Cl.

| | |
|---|---|
| B60K 17/354 | (2006.01) |
| B60K 17/344 | (2006.01) |
| B60K 23/08 | (2006.01) |
| F16H 3/089 | (2006.01) |
| F16H 25/22 | (2006.01) |

(Continued)

(52) U.S. Cl.
CPC ........ B60K 17/344 (2013.01); B60K 23/0808 (2013.01); F16H 3/089 (2013.01); F16H 25/2204 (2013.01); F16H 37/065 (2013.01); F16H 63/04 (2013.01); B60K 17/354 (2013.01); B60K 2023/0858 (2013.01); B60Y 2400/412 (2013.01); B60Y 2400/414 (2013.01); B60Y 2400/82 (2013.01)

(58) Field of Classification Search
CPC .............. B60K 17/344; B60K 23/0808; B60K 2023/0858; B60K 17/354; F16H 3/089; F16H 25/2204; F16H 37/065; F16H 63/04; B60Y 2400/412; B60Y 2400/414

See application file for complete search history.

(56) References Cited

U.S. PATENT DOCUMENTS

| | | | |
|---|---|---|---|
| 9,989,151 B2 * | 6/2018 | Imafuku | ................ B60K 17/08 |
| 9,994,103 B2 * | 6/2018 | Takaira | ................ B60K 17/02 |
| 2016/0096429 A1 * | 4/2016 | Imafuku | ............. B60K 17/344 180/233 |

FOREIGN PATENT DOCUMENTS

JP 2016-074342 A 5/2016

OTHER PUBLICATIONS

Nissan North America, Inc. "Structure and Operation", ESM Electronic Service Manual 2012 QX, Jul. 2011, pp. DLN-13-DLN-16.

* cited by examiner

Primary Examiner — Kevin Hurley
Assistant Examiner — Marlon A Arce
(74) Attorney, Agent, or Firm — Oliff PLC

(57) ABSTRACT

A transfer for a four-wheel drive vehicle includes an input shaft, an output shaft, a high-low switching mechanism, an output member, a clutch, a locking sleeve, a screw mechanism, a transmitting mechanism, a drum cam, and a switching mechanism. The switching mechanism is configured to selectively switch between an H4L position and an L4L position in conjunction with rotational motion of the electric motor. The H4L position is a position in which a high-low sleeve provided in the high-low switching mechanism is in a position in which a high-speed gear is established in the high-low switching mechanism. The L4L position is a position in which the high-low sleeve provided in the high-low switching mechanism is in a position in which a low-speed gear is established in the high-low switching mechanism.

8 Claims, 13 Drawing Sheets

(51) Int. Cl.
*F16H 37/06* (2006.01)
*F16H 63/04* (2006.01)

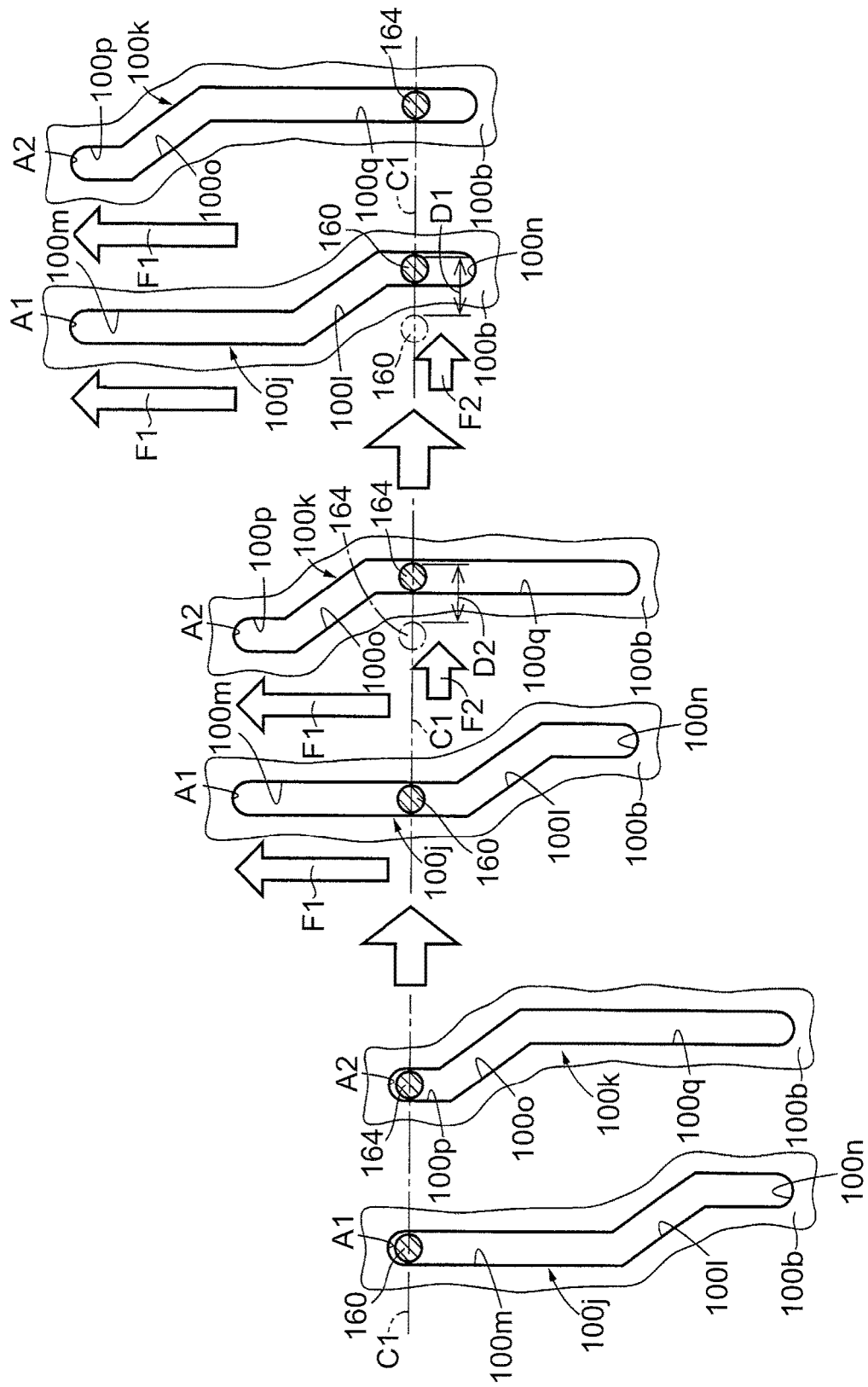

TRANSFER FOR FOUR-WHEEL DRIVE VEHICLE

INCORPORATION BY REFERENCE

The disclosure of Japanese Patent Application No. 2015-210272 filed on Oct. 26, 2015 including the specification, drawings and abstract is incorporated herein by reference in its entirety.

BACKGROUND

1. Technical Field

The disclosure relates to technology that, in a transfer for a four-wheel drive vehicle that both switches a high-low switching mechanism that changes a rate of rotation input from an input shaft and outputs the resultant rotation to an output shaft, and switches a 4WD locking mechanism that locks (i.e., directly connects) the output shaft to an output member to a 4WD locked state, with a single electric motor, selectively switches a high-low sleeve provided in the high-low switching mechanism and a locking sleeve provided in the 4WD locking mechanism between an H4L position in which a high-speed gear is established in the high-low switching mechanism and the output shaft and the output member are locked together, and an L4L position in which a low-speed gear is established in the high-low switching mechanism and the output shaft and the output member are locked together.

2. Description of Related Art

A transfer for a four-wheel drive vehicle that switches a high-low switching mechanism, switches a 4WD locking mechanism to a 4WD locked state, and adjusts transfer torque to auxiliary driving wheels with a clutch, all with a single electric motor, is well known. The transfer described in "ESM Electronic Service Manual 2012 QX", (US), NISSAN NORTH AMERICA, INC., July 2011, p. DLN-13 to DLN-16 is one such transfer. In the transfer described in "ESM Electronic Service Manual 2012 QX", (US), NISSAN NORTH AMERICA, INC., July 2011, p. DLN-13 to DLN-16, as conversion mechanisms that convert the rotation of the electric motor into linear motion, a drum cam is employed for the switching operation of the high-low switching mechanism and the switching operation of the 4WD locking mechanism, and a lever and ball cam are employed to adjust the transfer torque of the clutch.

SUMMARY

In the above-mentioned kind of transfer, if the clutch fails and the transfer torque to the auxiliary driving wheels is no longer able to be adjusted, for example, torque can be transmitted to the auxiliary driving wheels by switching the high-low sleeve and the locking sleeve to the L4L position in which the low-speed gear is established in the high-low switching mechanism and the output shaft and the output member are locked together. However, in the L4L position, the low-speed gear is established, so medium- to high-speed driving is difficult, and thus it takes a tremendous amount of time for the vehicle to move from place to place, which is problematic in a desert, for example. Also, on slopes and the like with a low μ, for example, the driving force becomes excessive, so controllability of the vehicle deteriorates, which is also problematic.

The embodiments provide a transfer for a four-wheel drive vehicle, which is capable of switching the high-low sleeve and the locking sleeve to a H4L position in which the high-speed gear is established in the high-low switching mechanism and the output shaft and the output member are locked together.

One aspect relates to a transfer for a four-wheel drive vehicle, which includes an input shaft, an output shaft, a high-low switching mechanism, an output member, a clutch, a locking sleeve, a screw mechanism, a transmitting mechanism, a drum cam, and a switching mechanism. The output shaft has a common axis with the input shaft. The high-low switching mechanism is configured to change a rate of rotation input from the input shaft and transmit the resultant rotation to the output shaft by a motion of a high-low sleeve in an axial direction of the out-put shaft, and the high low switching mechanism is connected to the input shaft. The output member is configured to output power to a second output destination that is different from a first output destination of the output shaft. The clutch is configured to adjust and transmit some of the power from the output shaft to the output member. The locking sleeve is configured to move in the axial direction of the output shaft. The locking sleeve is supported by the output shaft in a manner so that the locking sleeve is unable to rotate around the axis of the output shaft relative to the output shaft. The locking sleeve is configured to selectively engage with the output member so that the output shaft and the output member lock together. The screw mechanism includes a threaded shaft member, a nut member, and an electric motor. The threaded shaft member and the nut member are supported by the output shaft and are screwed together. The electric motor is configured to rotatably drive one of the threaded shaft member and the nut member so that the nut member moves linearly in the axial direction of the output shaft. The transmitting mechanism is configured to transmit the linear motion of the nut member to the clutch. The drum cam is configured to convert a rotational motion of the electric motor into a linear motion in the axial direction of the out-put shaft. The switching mechanism is configured to selectively switch the high-low sleeve and the locking sleeve between an H4L position and an L4L position, by transmitting the linear motion converted by the drum cam to the high-low sleeve and the locking sleeve via a high-low shift fork and a 4WD locking fork respectively, in conjunction with rotational motion of the electric motor. The H4L position is a position in which a high-low sleeve provided in the high-low switching mechanism is in a position in which a high-speed gear is established in the high-low switching mechanism, and the locking sleeve is in a position in which the output shaft and the output member are locked together. The L4L position is a position in which the high-low sleeve provided in the high-low switching mechanism is in a position in which a low-speed gear is established in the high-low switching mechanism, and the locking sleeve is in the position in which the output shaft and the output member are locked together.

With the transfer according to this aspect, if the clutch fails and transfer torque to the auxiliary driving wheels is no longer able to be adjusted, for example, the high-low sleeve and the locking sleeve are switched to the H4L position by the switching mechanism, such that the high-speed gear is established in the high-low switching mechanism and the output shaft and the output member are locked together, thereby enabling the vehicle to run in 4WD at medium to high speed in a desert or the like, as well as improving controllability of the vehicle on slopes with a low μ, for example.

In the transfer according to the aspect described above, the transfer may further includes a second shaft that is arranged parallel to the output shaft. The second shaft may be configured to move in an axial direction of the second shaft. The high-low shift fork and the 4WD locking fork may be configured to alternately engage the second shaft. The switching mechanism is configured to transmit a motion of the second shaft in an axial direction to the high-low sleeve and the locking sleeve via the high-low shift fork and the 4WD locking fork respectively.

With the transfer according to this aspect, if the clutch fails and transfer torque to the auxiliary driving wheels is no longer able to be adjusted, for example, the high-low sleeve and the locking sleeve are switched to the H4L position by the switching mechanism, such that the high-speed gear is established in the high-low switching mechanism and the output shaft and the output member are locked together, thereby enabling the vehicle to run in 4WD at medium to high speed in a desert or the like, as well as improving controllability of the vehicle on slopes with a low μ, for example.

In the transfer according to the aspect described above, the switching mechanism may include a fixed shaft, a first stopper, and a second stopper. The fixed shaft may be arranged parallel to the second shaft. The high-low shift fork may have a first pair of through-holes through which the second shaft and the fixed shaft pass so that the high-low shift fork moves in the axial direction of the second shaft and the fixed shaft. The high-low shift fork may have a first communication hole that communicates between the first pair of through-holes. A first interlocking member may be arranged inside the first communication hole. The first interlocking member may be configured to move in an axial direction of the first communication hole so that a first end portion of the first interlocking member selectively engages with a recessed portion on the second shaft, and a second end portion of the first interlocking member selectively engages with a recessed portion on the fixed shaft. The 4WD locking fork may have a second pair of through-holes through which the second shaft and the fixed shaft pass so that the 4WD locking fork moves in the axial direction of the second shaft and the fixed shaft. The 4WD locking fork may have a second communication hole that communicates between the second pair of communication holes. A second interlocking member may be arranged inside the second communication hole. The second interlocking member may be configured to move in an axial direction of the second communication hole so that a first end portion of the second interlocking member selectively engages with a recessed portion on the second shaft, and a second end portion of the second interlocking member selectively engages with a recessed portion on the fixed shaft. The first stopper may be arranged on the second shaft. The first stopper may be configured to selectively move the high-low shift fork in the axial direction by the movement of the second shaft in the axial direction of the second shaft. The second stopper may be arranged on the second shaft. The second stopper may be configured to selectively move the 4WD locking fork in the axial direction by the movement of the second shaft in the axial direction of the second shaft. The switching mechanism may be configured to alternately engage the second shaft and the high-low shift fork, and the second shaft and the 4WD locking fork, by the first stopper, the second stopper, the first inter locking member, and the second interlocking member so that the movement of the second shaft is alternately transmitted to the high-low shift fork or the 4WD locking fork.

With the transfer according to this aspect, in the switching mechanism, the second shaft and the high-low shift fork, and the second shaft and the 4WD locking fork, are alternately engaged by the first stopper, the second stopper, the first interlocking member, and the second interlocking member, such that the movement of the second shaft is alternately transmitted to the high-low shift fork or the 4WD locking fork. As a result, the distance between the output shaft and the second shaft is able to be shortened by the drum cam not being provided on the second shaft, and thus the transfer is able to be smaller than a transfer that selectively switches the high-low sleeve and the locking sleeve between the H4L position and the L4L position by adding the drum cam to the second shaft and rotating the second shaft and the drum cam, for example.

In the transfer according to the aspect described above, the transfer may further includes a second shaft and a third shaft. The second shaft may be arranged parallel to the output shaft. The second shaft may be configured to move in an axial direction of the second shaft. The third shaft may be arranged parallel to the output shaft. The third shaft may be configured to move in an axial direction of the third shaft. The high-low shift fork may be connected to the second shaft. The 4WD locking fork may be connected to the third shaft. The switching mechanism may be configured to transmit a motion of the second shaft in an axial direction to the high-low sleeve via the high-low shift fork. The switching mechanism may be configured to transmit a motion of the third shaft in an axial direction to the locking sleeve via the 4WD locking fork.

With the transfer according to this aspect, if the clutch fails and transfer torque to the auxiliary driving wheels is no longer able to be adjusted, for example, the high-low sleeve and the locking sleeve are switched to the H4L position by the switching mechanism, such that the high-speed gear is established in the high-low switching mechanism and the output shaft and the output member are locked together, thereby enabling the vehicle to run in 4WD at medium to high speed in a desert or the like, as well as improving controllability of the vehicle on slopes with a low μ, for example.

In the transfer according to aspect described above, an output shaft support bearing that rotatably supports an end portion of the output shaft on the drum cam side, may be arranged inside the drum cam within a length range of the drum cam in the axial direction of the output shaft.

With the transfer according to this aspect, the length of the dimension of the transfer in the axial direction of the output shaft is suitably short.

In the transfer according to the aspect described above, a cam engaging member may be connected to the second shaft. The drum cam may have a cam groove that engages with the cam engaging member. The cam groove may be configured to move the cam engaging member in the axial direction of the second shaft by the drum cam that is connected to one of the threaded shaft member and the nut member and rotates around the axis of the output shaft. The cam groove may have an inclined cam groove portion that extends in a direction inclined with respect to the axis of the output shaft such that an amount of movement in the axial direction of the second shaft by the rotation of the drum cam is greater than an amount of movement of the nut member in the axial direction of the output shaft by the rotation of one of the threaded shaft member and the nut member.

With the transfer according to this aspect, the responsiveness when the high-low switching mechanism switches between the high-speed gear and the low-speed gear is significantly improved compared to when the switch between the high-speed gear and the low-speed gear is achieved by the nut member of the screw mechanism moving in the axial direction of the output shaft, for example.

In the transfer according to the aspect described above, the nut member may screw together with the threaded shaft member via a plurality of balls located between the nut member and the threaded shaft member.

With the transfer according to this aspect, the relative rotation between the nut member and the threaded shaft member is smoother, so the power required of the electric motor during operation is stably reduced.

In the transfer according to the aspect described above, the cam engaging member may transmit the movement of the cam engaging member that is in the axial direction of the output shaft to the second shaft via a spring member.

With the transfer according to this aspect, when the high-low switching mechanism switches between the high-speed gear and the low-speed gear, shock that accompanies the switch of the high-low switching mechanism is absorbed by the spring member.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 14A is a view of the first cam groove and the second cam groove hypothetically lined up, with the position of the second cam groove formed on the drum cam rotated a predetermined angle, and shows the positions of a first cam engaging member and a second cam engaging member when the drum cam is rotated to the high gear position;

FIG. 14B is a view of the first cam groove and the second cam groove hypothetically lined up, with the position of the second cam groove formed on the drum cam rotated a predetermined angle, and shows the positions of the first cam engaging member and the second cam engaging member when the drum cam is rotated to the H4L position; and FIG. 14C is a view of the first cam groove and the second cam groove hypothetically lined up, with the position of the second cam groove formed on the drum cam rotated a predetermined angle, and shows the positions of the first cam engaging member and the second cam engaging member when the drum cam is rotated to the L4L position.

DETAILED DESCRIPTION OF EMBODIMENTS

Hereinafter, example embodiments will be described with reference to the accompanying drawings. The drawings described in the example embodiments below have been simplified or modified as appropriate, so the scale ratios and the shapes and the like of the portions are not always accurately depicted.

Figure 1:
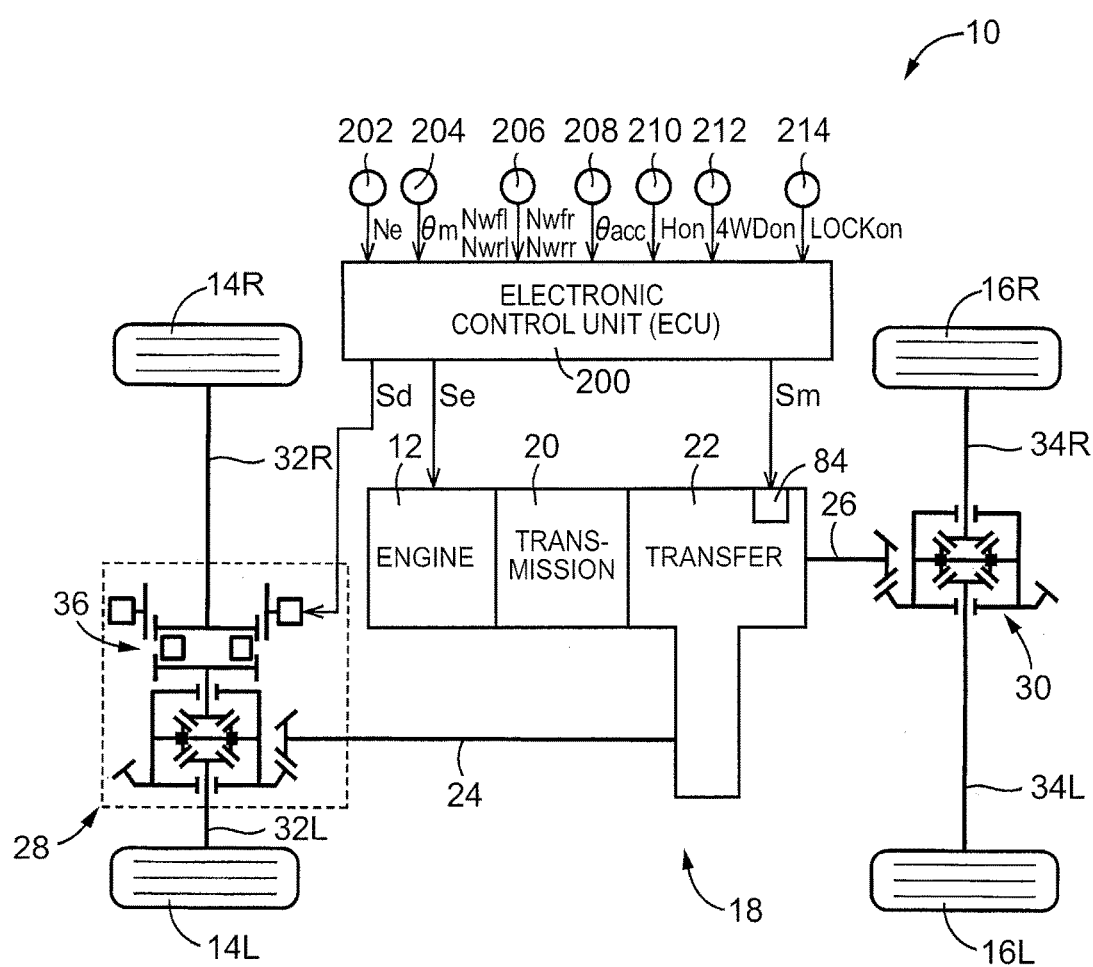
FIG. 1 is a view schematically showing the structure of a vehicle to which the embodiments may be applied, and illustrates the main portions of a control system for various controls in the vehicle.

FIG. 1 is a view schematically showing the structure of a vehicle 10 to which the embodiments may be applied, and illustrates the main portions of a control system for various controls in the vehicle 10. As shown in FIG. 1, the vehicle 10 includes an engine 12 as a driving force source, left and right front wheels 14L and 14R (simply referred to as "front wheels 14" unless otherwise specified), left and right rear wheels 16L and 16R (simply referred to as "rear wheels 16" unless otherwise specified), and a power transmitting apparatus 18 that transmits power from the engine 12 to the front wheels 14 and the rear wheels 16, and the like. The rear wheels 16 are main driving wheels that are driving wheels both when running in two-wheel drive (2WD) and in four-wheel drive (4WD). The front wheels 14 are auxiliary driving wheels that are driven wheels when running in 2WD and are driving wheels when running in 4WD. The vehicle 10 is a front engine rear wheel drive (FR)-based four-wheel drive vehicle.

The power transmitting apparatus 18 includes a transmission 20, a four-wheel drive vehicle transfer 22 (hereinafter, simply referred to as "transfer 22"), a front propeller shaft 24, a rear propeller shaft 26, a front wheel differential gear unit 28, a rear wheel differential gear unit 30, left and right front wheel axles 32L and 32R (simply referred to as "front wheel axles 32" unless otherwise specified), and left and right rear wheel axles 34L and 34R (simply referred to as "rear wheel axles 34" unless otherwise specified), and the like. The transmission 20 is connected to the engine 12. The transfer 22 is a front-rear wheel power transfer that is connected to the transmission 20. The front propeller shaft 24 and the rear propeller shaft 26 are both connected to the transfer 22. The front wheel differential gear unit 28 is connected to the front propeller shaft 24. The rear wheel differential gear unit 30 is connected to the rear propeller shaft 26. The front wheel axles 32 are connected to the front wheel differential gear unit 28. The rear wheel axles 34 are connected to the rear wheel differential gear unit 30. In the power transmitting apparatus 18 structured in this way, power from the engine 12 that has been transmitted to the transfer 22 via the transmission 20 is transmitted from the transfer 22 to the rear wheels 16 via a power transmitting path on the rear wheel side that includes the rear propeller shaft 26, the rear wheel differential gear unit 30, and the rear wheel axles 34 and the like in this order. Also, some of the power from the engine 12 that is to be transmitted to the rear wheel 16 side is distributed to the front wheel 14 side by the transfer 22, and then transmitted to the front wheels 14 via a power transmitting path on the front wheel side that includes the front propeller shaft 24, the front wheel differential gear unit 28, and the front wheel axles 32 and the like in this order.

The front wheel differential gear unit 28 includes a front-side clutch 36 on the front wheel axle 32R side (i.e., between the front wheel differential gear unit 28 and the front wheel 14R). The front-side clutch 36 is a mesh-type clutch that is electrically (electromagnetically) controlled and selectively establishes or interrupts the power transmitting path between the front wheel differential gear unit 28 and the front wheel 14R. The front-side clutch 36 may also be provided with a synchronizing mechanism (synchro mechanism).

Figure 2:
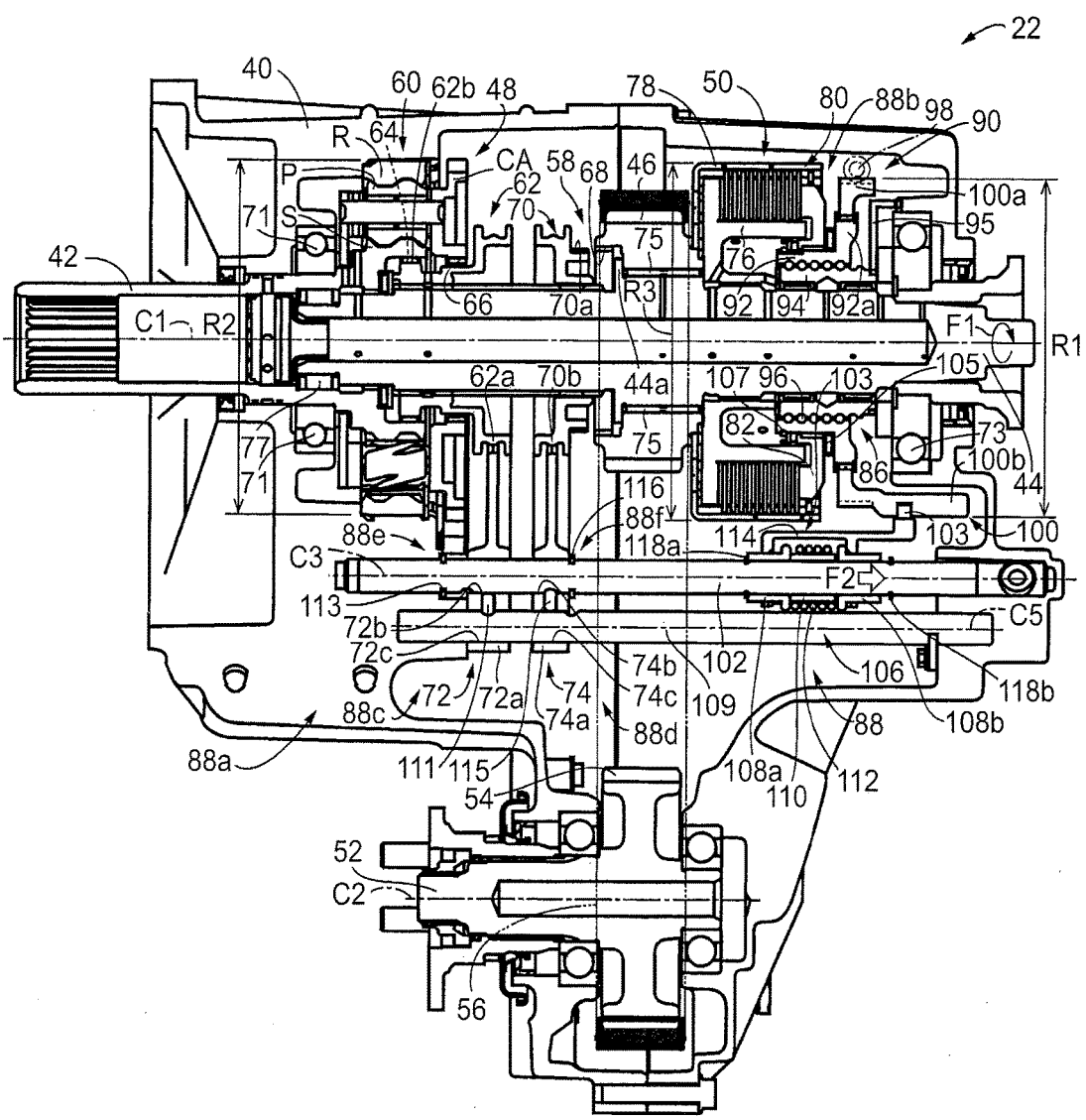
FIG. 2 is a sectional view schematically showing the structure of a transfer, and illustrates the manner for switching to a 4WD running state in a high-speed gear.
Figure 3:
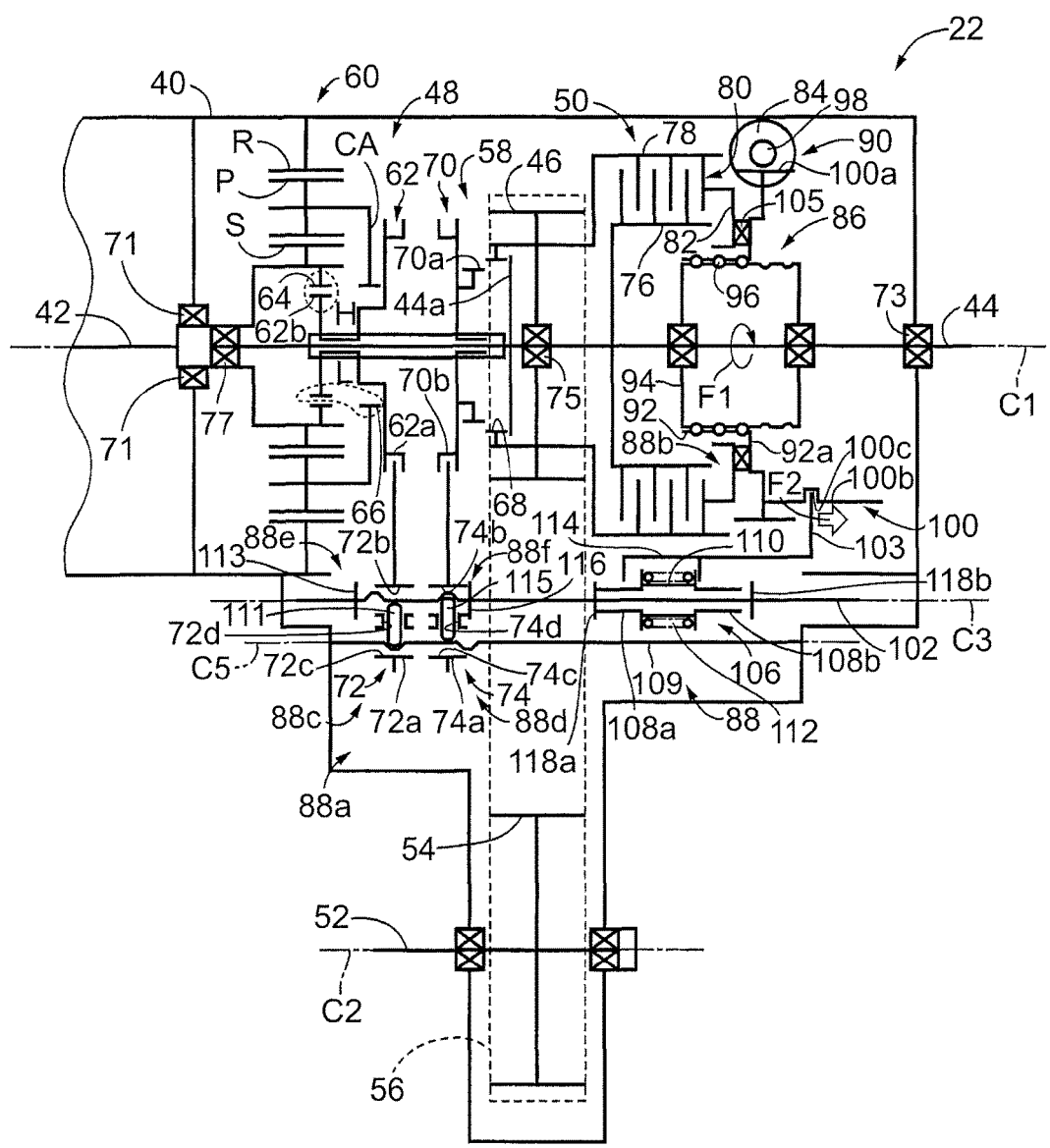
FIG. 3 is a skeleton view schematically showing the structure of the transfer.
Figure 4:
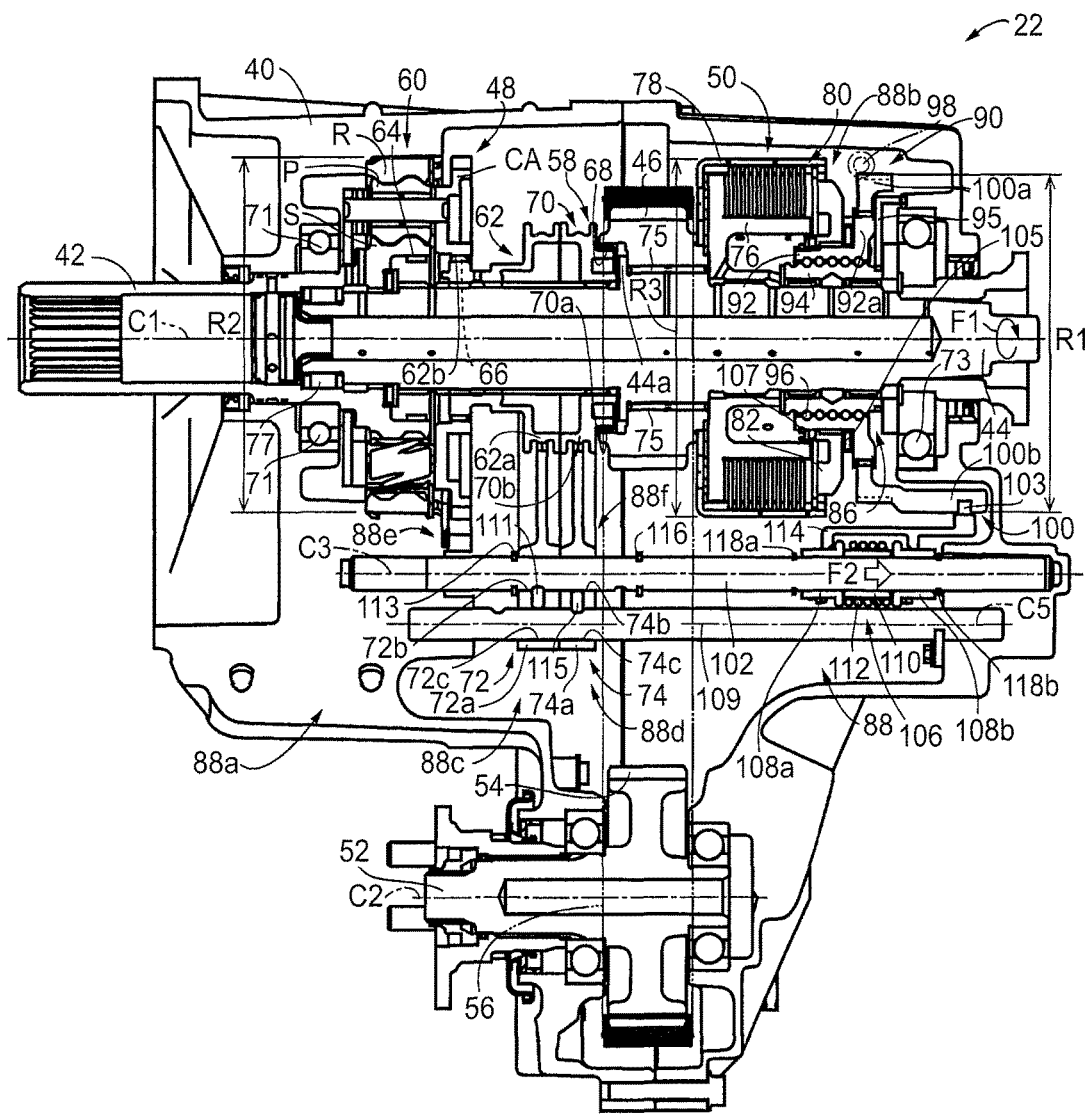
FIG. 4 is a sectional view schematically showing the structure of the transfer, and illustrates a manner for switching to a 4WD running state in a 4WD locked state in a low-speed gear.

FIGS. 2 to 4 are views schematically showing the structure of the transfer 22. FIGS. 2 and 4 are sectional views of the transfer 22, and FIG. 3 is a skeleton view of the transfer 22. As shown in FIGS. 2 to 4, the transfer 22 includes a transfer case 40 as a non-rotating member. The transfer 22 includes, all around a common first axis (axis) C1, an input shaft 42 that is rotatably supported by the transfer case 40, a rear-wheel side output shaft (output shaft) 44 that outputs power to the rear wheels 16 that serve as first left and right driving wheels, a sprocket-shaped drive gear (output member) 46 that outputs power to the front wheels 14 that serve as second left and right driving wheels, i.e., that has a different power output destination than the rear-wheel side output shaft 44, a high-low switching mechanism 48 as an auxiliary transmission that changes the rate of rotation input from the input shaft 42 and transmits the resultant rotation to the rear-wheel side output shaft 44, and a front-wheel drive clutch (clutch) 50 as a multiple disc friction clutch (multiple disc clutch) that adjusts the transfer torque transmitted from the rear-wheel side output shaft 44 to the drive gear 46, i.e., that adjusts some of the power of the rear-wheel side output shaft 44 and transmits it to the drive gear 46. The input shaft 42 and the rear-wheel side output shaft 44 are supported by the transfer case 40 via a pair of support bearings, i.e., a first support bearing 71 and a second support bearing (output shaft support bearing) 73, so as to each be able to rotate around the same axis mutually. The drive gear 46 is supported by the rear-wheel side output shaft 44 via a third support bearing 75 in a manner concentric with, and rotatable relative to, the rear-wheel side output shaft 44. That is, the input shaft 42, the rear-wheel side output shaft 44, and the drive gear 46 are each supported by the transfer case 40 so as to be able to rotate around the first axis C1. That is, the first axis C1 is common to the input shaft 42, the rear-wheel side output shaft 44, and the drive gear 46. A front-side end portion of the rear-wheel side output shaft 44 is rotatably supported by a bearing 77 that is arranged between a rear-side end portion of the input shaft 42 and the front-side end portion of the rear-wheel side output shaft 44, and a rear-side end portion of the rear-wheel side output shaft 44, i.e., the end portion on a drum cam 100 side, described later, from among both end portions of the rear-wheel side output shaft 44, is rotatably supported by the second support bearing 73.

As shown in FIGS. 2 to 4, the transfer 22 includes, inside the transfer case 40 and around a common second axis C2 that is parallel to the first axis C1, a front-wheel side output shaft 52, and a sprocket-shaped driven gear 54 integrally provided on the front-wheel side output shaft 52. Furthermore, the transfer 22 includes a front-wheel drive chain 56 that is wound around between the drive gear 46 and the driven gear 54, and a 4WD locking mechanism 58 as a dog clutch that integrally connects (i.e., locks) the rear-wheel side output shaft 44 and the drive gear 46 together.

The input shaft 42 is connected to an output shaft, not shown, of the transmission 20, via a coupling, and is rotatably driven by driving force (torque) input from the engine 12 via the transmission 20. The rear-wheel side output shaft 44 is a main drive shaft that is connected to the rear propeller shaft 26. The drive gear 46 is provided in a manner able to rotate relatively around the first axis C1 of the rear-wheel side output shaft 44. The front-wheel side output shaft 52 is an auxiliary drive shaft that is connected to the front propeller shaft 24 via a coupling, not shown.

The transfer 22 structured in this way adjusts the transfer torque transmitted to the drive gear 46 with the front-wheel drive clutch 50, and transmits the power transmitted from the transmission 20 to only the rear wheels 16, or distributes it to the front wheels 14 as well. Also, the transfer 22 switches between a 4WD locked state that prevents differential rotation between the rear propeller shaft 26 and the front propeller shaft 24, and a 4WD unlocked state that allows differential rotation between these, by the 4WD locking mechanism 58. Also, the transfer 22 establishes one of a high-speed gear H and a low-speed gear L, and changes the rate of rotation input from the transmission 20 and transmits the resultant rotation downstream. That is, the transfer 22 transmits the rotation of the input shaft 42 to the rear-wheel side output shaft 44 via the high-low switching mechanism 48. Also, when transfer torque through the front-wheel drive clutch 50 is zero and the 4WD locking mechanism 58 is released, power is not transmitted from the rear-wheel side output shaft 44 to the front-wheel side output shaft 52. On the other hand, when torque is transmitted through the front-wheel drive clutch 50 or the 4WD locking mechanism 58 is engaged, power is transmitted from the rear-wheel side output shaft 44 to the front-wheel side output shaft 52 via the drive gear 46, the front-wheel drive chain 56, and the driven gear 54.

More specifically, the high-low switching mechanism 48 includes a single pinion planetary gear set 60 and a high-low sleeve 62. The planetary gear set 60 includes a sun gear S that is connected to the input shaft 42 in a manner non-rotatable around the first axis C1 with respect to the input shaft 42, a ring gear R that is arranged substantially concentric with the sun gear S and is connected, in a manner non-rotatable around the first axis C1, to the transfer case 40, and a carrier CA that rotatably supports a plurality of pinion gears P that are in mesh with the sun gear S and the ring gear R, in a manner that enables the pinion gears P to revolve around the sun gear S. Therefore, the rotation speed of the sun gear S is the same as that of the input shaft 42, and the rotation speed of the carrier CA is slower than that of the input shaft 42. Also, high-side gear teeth 64 are fixed on an inner peripheral surface of this sun gear S, and low-side gear teeth 66 of the same diameter as the high-side gear teeth 64 are fixed on the carrier CA. The high-side gear teeth 64 are spline teeth that output rotation at the same speed as the input shaft 42 and are involved with establishing the high-speed gear H. The low-side gear teeth 66 are spline teeth that output rotation at a slower speed than the high-side gear teeth 64 and are involved with establishing the low-speed gear L. The high-low sleeve 62 is spline engaged with the rear-wheel side output shaft 44 in a manner able to move relative to the rear-wheel side output shaft 44 in a direction parallel to the first axis C1. The high-low sleeve 62 has a fork connecting portion 62a, and outer peripheral teeth 62b that are integrally provided adjacent to the fork connecting portion 62a and mesh with the high-side gear teeth 64 and the low-side gear teeth 66 by the high-low sleeve 62 moving in the direction parallel to the first axis C1 of the rear-wheel side output shaft 44. Rotation at the same speed as the rotation of the input shaft 42 is transmitted to the rear-wheel side output shaft 44 when the outer peripheral teeth 62b are in mesh with the high-side gear teeth 64, and rotation at a slower speed than the rotation of the input shaft 42 is transmitted to the rear-wheel side output shaft 44 when the outer peripheral teeth 62b are in mesh with the low-side gear teeth 66. The high-side gear teeth 64 and the high-low sleeve 62 function as a high-speed gear clutch for establishing the high-speed gear H, and the low-side gear teeth 66 and the high-low sleeve 62 function as a low-speed gear clutch for establishing the low-speed gear L.

The 4WD locking mechanism 58 has locking teeth 68 fixed on an inner peripheral surface of the drive gear 46, and a locking sleeve 70 that is spline engaged with the rear-wheel side output shaft 44 so as to be able to move in the direction of the first axis C1 with respect to the rear-wheel side output shaft 44 and unable to rotate relative to the rear-wheel side output shaft 44, and that has, fixed to an outer peripheral surface thereof, meshing teeth 70a that mesh with the locking teeth 68 formed on the drive gear 46 when the locking sleeve 70 moves in the direction of the first axis C1. In the transfer 22, when the 4WD locking mechanism 58 is in an engaged state in which the meshing teeth 70a of the locking sleeve 70 are in mesh with the locking teeth 68, i.e., in which the meshing teeth 70a of the locking sleeve 70 are engaged with the locking teeth 68 of the drive gear 46, the rear-wheel side output shaft 44 and the drive gear 46 are locked together such that the rear-wheel side output shaft 44 and the drive gear 46 rotate together as a unit, and thus the 4WD locked state is established.

The high-low sleeve 62 is provided in a space on the drive gear 46 side of the first support bearing 71 provided on the input shaft 42 (more specifically, in a space on the drive gear 46 side of the planetary gear set 60). The locking sleeve 70 is provided separate from and adjacent to the high-low sleeve 62, in the space between the high-low switching mechanism 48 and the drive gear 46. The high-side gear teeth 64 are provided in a position farther away from the locking sleeve 70 than the low-side gear teeth 66 when viewed in a direction parallel to the first axis C1. The outer peripheral teeth 62b of the high-low sleeve 62 mesh with the high-side gear teeth 64 on the side where the high-low sleeve 62 moves away from the locking sleeve 70 (i.e., on the left side in FIGS. 2 and 3), and mesh with the low-side gear teeth 66 on the side where the high-low sleeve 62 moves toward the locking sleeve 70 (i.e., on the right side in FIGS. 2 and 3). The meshing teeth 70a of the locking sleeve 70 mesh with the locking teeth 68 on the side where the locking sleeve 70 moves toward the drive gear 46 (i.e., on the right side in FIGS. 2 and 3).

The front-wheel drive clutch 50 is a multiple disc friction clutch that includes a clutch hub 76 that is connected to the rear-wheel side output shaft 44 in a manner unable to rotate relative to the rear-wheel side output shaft 44, a clutch drum 78 that is connected to the drive gear 46 in a manner unable to rotate relative to the drive gear 46, a friction engagement element 80 that is interposed between the clutch hub 76 and the clutch drum 78 and selectively engages and disengages the clutch hub 76 and the clutch drum 78, and a piston 82 that presses on the friction engagement element 80. The front-wheel drive clutch 50 is arranged around the first axis C1 of the rear-wheel side output shaft 44, on the opposite side of the drive gear 46 from the high-low switching mechanism 48 in the direction of the first axis C1 of the rear-wheel side output shaft 44. The friction engagement element 80 is pressed on by the piston 82 that moves toward the drive gear 46 side. The front-wheel drive clutch 50 is placed in a released state when the piston 82 is moved toward the non-pressing side (i.e., the right side in FIGS. 2 and 3) that is the side away from the drive gear 46 in a direction parallel to the first axis C1, and is not abutting against the friction engagement element 80. On the other hand, the front-wheel drive clutch 50 is placed in a slip state or an engaged state by the transfer torque (torque capacity) being adjusted by the amount of movement of the piston 82, when the piston 82 is moved toward the pressing side (i.e., the left side in FIGS. 2 and 3) that is the side closer to the drive gear 46 in a direction parallel to the first axis C1, and is abutting against the friction engagement element 80.

When the front-wheel drive clutch 50 is in the released state and the 4WD locking mechanism 58 is in a released state in which the meshing teeth 70a of the locking sleeve 70 are not in mesh with the locking teeth 68, the power transmitting path between the rear-wheel side output shaft 44 and the drive gear 46 is interrupted such that the transfer 22 transmits the power transmitted from the transmission 20 to only the rear wheels 16. When the front-wheel drive clutch 50 is in the slip state or the engaged state, the transfer 22 distributes the power transmitted from the transmission 20 to both the front wheels 14 and the rear wheels 16. When the front-wheel drive clutch 50 is in the slip state, differential rotation is allowed between the rear-wheel side output shaft 44 and the drive gear 46, such that a differential state (4WD unlocked state) is established in the transfer 22. When the front-wheel drive clutch 50 is in the engaged state, the rear-wheel side output shaft 44 and the drive gear 46 rotate together as a unit, such that the 4WD locked state is established in the transfer 22. The front-wheel drive clutch 50 is able to continuously change the torque distribution between the front wheels 14 and the rear wheels 16 between 0:100 and 50:50, for example, by controlling the transfer torque.

The transfer 22 also includes, as an apparatus that operates the high-low switching mechanism 48, the front-wheel drive clutch 50, and the 4WD locking mechanism 58, an electric motor (electric motor) 84 (see FIG. 3), and a transmitting mechanism 88 that transmits the rotational motion of the electric motor 84 to the high-low switching mechanism 48, the front-wheel drive clutch 50, and the 4WD locking mechanism 58. In the transmitting mechanism 88, the linear motion force of a nut member 92 of a screw mechanism 86 that converts the rotational motion of the electric motor 84 into linear motion is transmitted to the front-wheel drive clutch 50, and the rotational motion force of the nut member 92 is transmitted to the high-low switching mechanism 48 and the 4WD locking mechanism 58 via a drum cam 100 and the like, described later.

Figure 5:
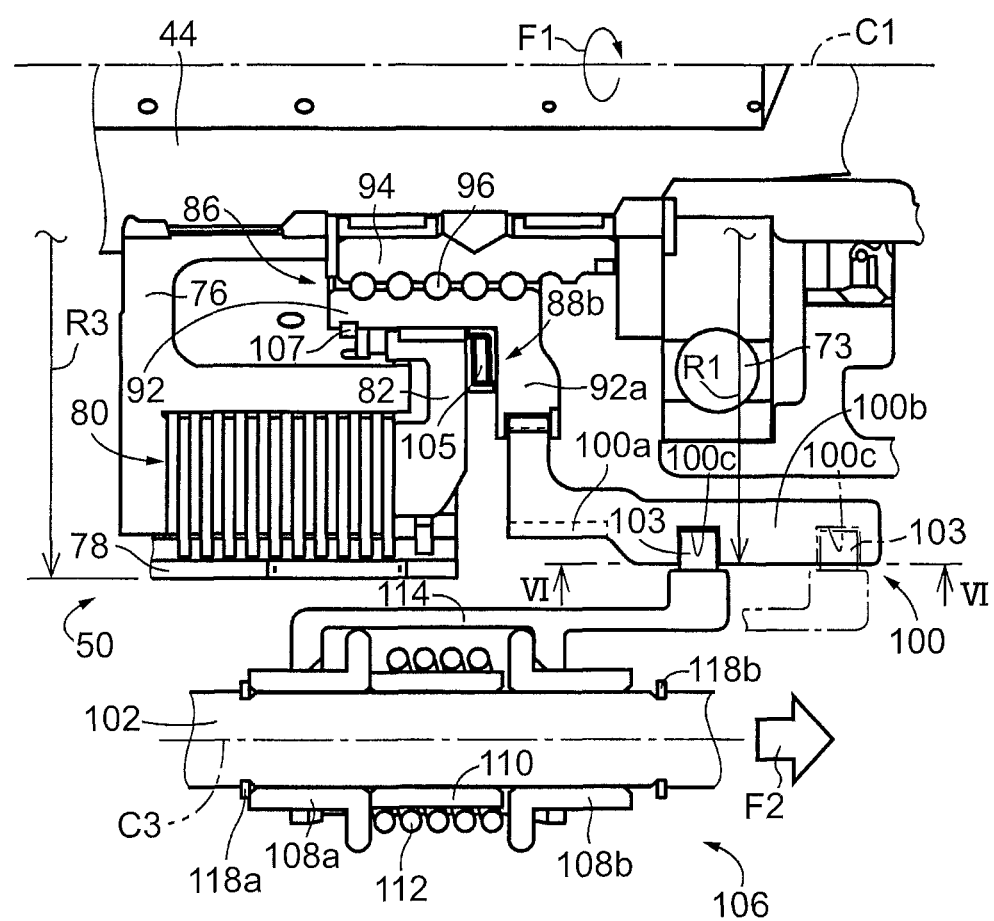
FIG. 5 is an enlarged view of FIG. 2, illustrating a drum cam provided in the transfer.

The screw mechanism 86 is arranged around the same first axis C1 as the rear-wheel side output shaft 44, on the opposite side of the front-wheel drive clutch 50 from the drive gear 46, and includes a nut member (one threaded member) 92 as a rotating member that is indirectly connected to the electric motor 84 via a worm gear 90 provided in the transfer 22, a threaded shaft member (another threaded member) 94 that screws together with the nut member 92, and a connecting member 95 that connects a rear-side end portion of threaded shaft member 94 to the transfer case 40 that is a non-rotating member, in order to arrange the threaded shaft member 94 on the rear-wheel side output shaft 44 in a manner unable to move in the direction of the first axis C1 of the rear-wheel side output shaft 44 and unable to rotate around the first axis C1. The nut member 92 screws together with the threaded shaft member 94 via a plurality of balls 96, and the screw mechanism 86 is a ball screw in which the nut member 92 and the threaded shaft member 94 operate via the plurality of balls 96. With the screw mechanism 86 structured in this way, the nut member 92, which is one of the screw members, of the threaded shaft member 94 and the nut member 92 that are supported by the rear-wheel side output shaft 44 and screw together, moves in the direction of the first axis C1 of the rear-wheel side output shaft 44 by being rotatably driven by the electric motor 84. Of the nut member 92 and the threaded shaft member 94 that are supported by the rear-wheel side output shaft 44, the nut member 92 is rotatably supported around the first axis C1 of the rear-wheel side output shaft 44 by the rear-wheel side output shaft 44, by being screwed together with the threaded shaft member 94, and the threaded shaft member 94 is supported by the rear-wheel side output shaft 44 in a manner unable to move in the direction of the first axis C1 of the rear-wheel side output shaft 44 and unable to rotate around the first axis C1 of the rear-wheel side output shaft 44, by the connecting member 95. Also, in this example embodiment, when the nut member 92 is rotated in the direction of arrow F1 around the first axis C1 by the electric motor 84 as shown in FIGS. 2 and 5, the nut member 92 moves in a direction away from the front-wheel drive clutch 50, i.e., in the direction of arrow F2, in the direction of the first axis C1, by the screwing action with the threaded shaft member 94.

The worm gear 90 is a gear pair that includes a worm 98 integrally formed on a motor shaft of the electric motor 84, and a worm wheel 100*a* that is formed on the drum cam 100 fixed to a flange portion 92*a* formed on a rear-side end portion of the nut member 92. For example, rotation of the electric motor 84 that is a brushless motor is reduced in speed and transmitted to the nut member 92 via the worm gear 90. The screw mechanism 86 converts the rotation of the electric motor 84 transmitted to the nut member 92 into linear motion of the nut member 92. Also, the worm wheel 100*a* formed on the drum cam 100 that is connected to, i.e., fixed to, the nut member 92 moves in the direction of the first axis C1 of the rear-wheel side output shaft 44 by the electric motor 84 being rotatably driven. However, even when the worm wheel 100*a* moves, the width dimension in the direction of the first axis C1 of the worm wheel 100*a* is larger than the width dimension in the direction of the first axis C1 of the worm 98 that is formed on the motor shaft of the electric motor 84 that is fixed to the transfer case 40, and the outer peripheral teeth of the worm wheel 100*a* are formed as spur teeth, such that the worm wheel 100*a* is in constant mesh with the worm 98 formed on the motor shaft.

The transmitting mechanism 88 includes a switching mechanism 88*a* that selectively switches the high-low sleeve 62 and the locking sleeve 70 among three positions in conjunction with the rotational motion of the electric motor 84. These three positions are i) an H4L position in which the high-speed gear H is established in the high-low switching mechanism 48 and the rear-wheel side output shaft 44 and the drive gear 46 are locked together, ii) an L4L position in which the low-speed gear L is established in the high-low switching mechanism 48 and the rear-wheel side output shaft 44 and the drive gear 46 are locked together, and iii) a high gear (H4 or H2) position in which the high-speed gear H is established in the high-low switching mechanism 48 and the rear-wheel side output shaft 44 and the drive gear 46 are not locked together. The H4L position is a position in which the outer peripheral teeth 62*b* of the high-low sleeve 62 are in mesh with the high-side gear teeth 64 and the meshing teeth 70*a* of the locking sleeve 70 are in mesh with the locking teeth 68. Also, the L4L position is a position in which the outer peripheral teeth 62*b* of the high-low sleeve 62 are in mesh with the low-side gear teeth 66 and the meshing teeth 70*a* of the locking sleeve 70 are in mesh with the locking teeth 68. Further, the high gear (H4 or H2) position is a position in which the outer peripheral teeth 62*b* of the high-low sleeve 62 are in mesh with the high-side gear teeth 64 and the meshing teeth 70*a* of the locking sleeve 70 are not in mesh with the locking teeth 68. The transmitting mechanism 88 also includes a first transmitting mechanism (transmitting mechanism) 88*b* that transmits linear motion of the nut member 92 of the screw mechanism 86 to the front-wheel drive clutch 50.

The switching mechanism 88*a* includes a second transmitting mechanism 88*c* that transmits movement in the direction of a third axis (axis) C3 of a fork shaft (second shaft) 102 that is connected to a cam engaging member 103, described later, that is engaged with a cam groove 100*c* formed on the drum cam 100, to the high-low switching mechanism 48, and a third transmitting mechanism 88*d* that transmits movement in the direction of the third axis C3 of the fork shaft 102 to the 4WD locking mechanism 58. The fork shaft 102 is connected to the cam engaging member 103, and is arranged parallel to the rear-wheel side output shaft 44 and supported so as to be able to move in the direction of the third axis C3, inside the transfer case 40.

As shown in FIGS. 2 and 5, the drum cam 100 includes the annular worm wheel 100*a* that is in mesh with the worm 98 formed on the motor shaft of the electric motor 84, a protrusion 100*b* that protrudes in a direction toward the rear propeller shaft 26 from the worm wheel 100*a*, on the end portion on the fork shaft 102 side of the worm wheel 100*a*, and the cam groove 100*c* formed on the outer periphery of this protrusion 100*b*. The protrusion 100*b* has a shape in which a portion of the worm wheel 100*a* in the circumferential direction is a cylindrical portion, for example, that protrudes out in a direction toward the rear propeller shaft 26. The second support bearing 73 that rotatably supports the end portion of the rear-wheel side output shaft 44 that is on the drum cam 100 side, from among both end portions of the rear-wheel side output shaft 44, is arranged inside of the drum cam 100 within the length range of the drum cam 100 in the direction of the first axis C1 of the rear-wheel side output shaft 44. Also, the drum cam 100 is formed such that a dimension R1 of the drum cam 100 in the radial direction of the rear-wheel side output shaft 44 is equal to or less than a dimension R2 of the high-low switching mechanism 48 in the radial direction of the rear-wheel side output shaft 44 and a dimension R3 of the front-wheel drive clutch 50 in the radial direction of the rear-wheel side output shaft 44. The dimension R2 is an outer diameter dimension of the ring gear R or the carrier CA of the high-low switching mechanism 48. The dimension R3 is an outer diameter dimension of the clutch drum 78 of the front-wheel drive clutch 50.

Figure 6:
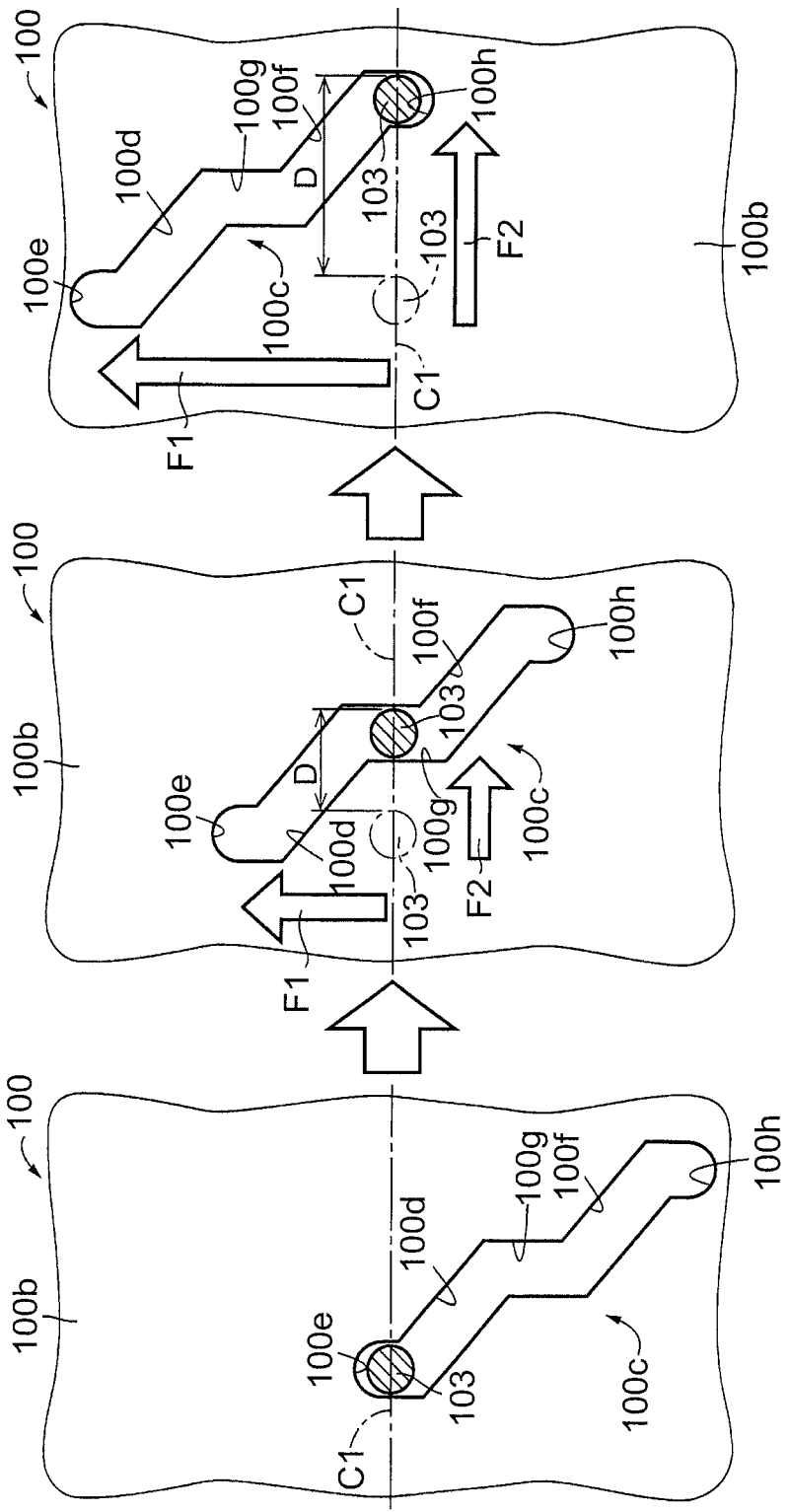
FIG. 6A is a sectional view taken along line VI-VI in FIG. 5, and shows the position of a cam engaging member when a fork shaft is in a high gear position.
FIG. 6B is a sectional view taken along line VI-VI in FIG. 5, and shows the position of the cam engaging member when the fork shaft is in an H4L position.
FIG. 6C is a sectional view taken along line VI-VI in FIG. 5, and shows the position of the cam engaging member when the fork shaft is in an L4L position.

As shown in FIG. 6A to 6C, the cam groove 100c formed on the drum cam 100 includes a first inclined cam groove portion 100d that extends in a direction inclined with respect to the first axis C1 of the rear-wheel side output shaft 44, a first cam groove portion 100e that is formed on an end portion on the screw mechanism 86 side of the first inclined cam groove portion 100d, and extends in a direction perpendicular to the first axis C1, a second inclined cam groove portion 100f that is arranged on the side opposite the screw mechanism 86 side with respect to the first inclined cam groove portion 100d, and extends in a direction inclined with respect to the first axis C1 of the rear-wheel side output shaft 44, a second cam groove portion 100g that connects the end portion on the screw mechanism 86 side of the second inclined cam groove portion 100f to the end portion of the first inclined cam groove portion 100d that is on the opposite side from the screw mechanism 86 side, and extends in a direction perpendicular to the first axis C1, and a third cam groove portion 100h that is formed on the end portion of the second inclined cam groove portion 100f that is on the side opposite the screw mechanism 86 side, and extends in a direction perpendicular to the first axis C1. With the drum cam 100 structured in this way, as shown in FIG. 6A, for example, when the drum cam 100 is rotated in the direction of arrow F1 around the first axis C1 as the nut member 92 is rotated in the direction of arrow F1 around the first axis C1 by the electric motor 84, the cam engaging member 103 is moved along the first inclined cam groove portion 100d, the second cam groove portion 100g, and the second inclined cam groove portion 100f of the drum cam 100 in the direction of arrow F2, i.e., in the direction of the third axis C3 of the fork shaft 102, by an amount of movement D that is greater than the amount of movement of the nut member 92 in the direction of arrow F2, i.e., the amount of movement of the nut member 92 in the direction of arrow F2 by the screwing action of the nut member 92 with the threaded shaft member 94, from a state in which the cam engaging member 103 is arranged inside the first cam groove portion 100e of the cam groove 100c of the drum cam 100. Also, as shown in FIG. 6C, for example, when the drum cam 100 is rotated in the direction opposite the direction of arrow F1 around the first axis C1 as the nut member 92 is rotated in the direction opposite the direction of arrow F1 around the first axis C1 by the electric motor 84, the cam engaging member 103 is moved along the second inclined cam groove portion 100f, the second cam groove portion 100g, and the first inclined cam groove portion 100d of the drum cam 100 in the direction opposite the direction of arrow F2, by an amount of movement D that is greater than the amount of movement of the nut member 92 in the direction opposite the direction of arrow F2, i.e., the amount of movement of the nut member 92 in the direction opposite the direction of arrow F2 by the screwing action of the nut member 92 with the threaded shaft member 94, from a state in which the cam engaging member 103 is arranged inside the third cam groove portion 100h of the cam groove 100c of the drum cam 100. That is, when the electric motor 84 is rotatably driven such that the drum cam 100 is rotated around the first axis C1 of the rear-wheel side output shaft 44 via the nut member 92, the cam engaging member 103 that is engaged with the cam groove 100c formed on the drum cam 100 is moved by this cam groove 100c in the direction of the third axis C3 of the fork shaft 102 arranged inside the transfer case 40, in parallel with the first axis C1 of the rear-wheel side output shaft 44. The circle formed by the alternate long and short dash line shown in FIGS. 6B and 6C indicates the position of the cam engaging member 103 in FIG. 6A. The first axis C1 of the rear-wheel side output shaft 44, the second axis C2 of the front-wheel side output shaft 52, and the third axis C3 of the fork shaft 102 are all parallel to one another.

Of FIGS. 6A to 6C, FIG. 6A is a view showing the position of the cam engaging member 103 when the high-low sleeve 62 and the locking sleeve 70 are in the high gear (H4 or H2) position, i.e., when the fork shaft 102 is in the high gear position. Also, FIG. 6B is a view showing the position of the cam engaging member 103 when the high-low sleeve 62 and the locking sleeve 70 are in the H4L position, i.e., when the fork shaft 102 is in the H4L position. Also, FIG. 6C is a view showing position of the cam engaging member 103 when the high-low sleeve 62 and the locking sleeve 70 are in the L4L position, i.e., when the fork shaft 102 is in the L4L position.

As shown in FIGS. 2 to 5, the first transmitting mechanism 88b includes a piston 82 that pushes the friction engagement element 80 of the front-wheel drive clutch 50, a thrust bearing 105 interposed between the piston 82 and a flange portion 92a of the nut member 92, and a stopper member 107 that prevents relative movement of the piston 82 toward the friction engagement element 80 side with respect to the nut member 92. The piston 82 is connected to the nut member 92 in a manner unable to move relative to the nut member 92 in the direction of the first axis C1 and able to rotate relative to the nut member 92 around the first axis C1, by the thrust bearing 105 and the stopper member 107. As a result, the linear motion of the nut member 92 of the screw mechanism 86 is transmitted to the friction engagement element 80 of the front-wheel drive clutch 50 via the first transmitting mechanism 88b.

Also, as shown in FIGS. 2 to 5, the second transmitting mechanism 88c includes a high-low shift fork 72 that is provided on the fork shaft 102 and is connected to the fork connecting portion 62a of the high-low sleeve 62, and a first moving mechanism 88e that selectively transmits the movement in the direction of the third axis C3 of the fork shaft 102 to the high-low shift fork 72, to selectively move the high-low shift fork 72 in the direction of the third axis C3, i.e., to selectively move the high-low sleeve 62 in the direction of the first axis C1. A standby mechanism 106 that transmits movement in the direction of the first axis C1 of the cam engaging member 103, i.e., in the direction of the third axis C3, to the fork shaft 102 via a spring member 112 is provided between the fork shaft 102 and the cam engaging member 103.

Figure 7:
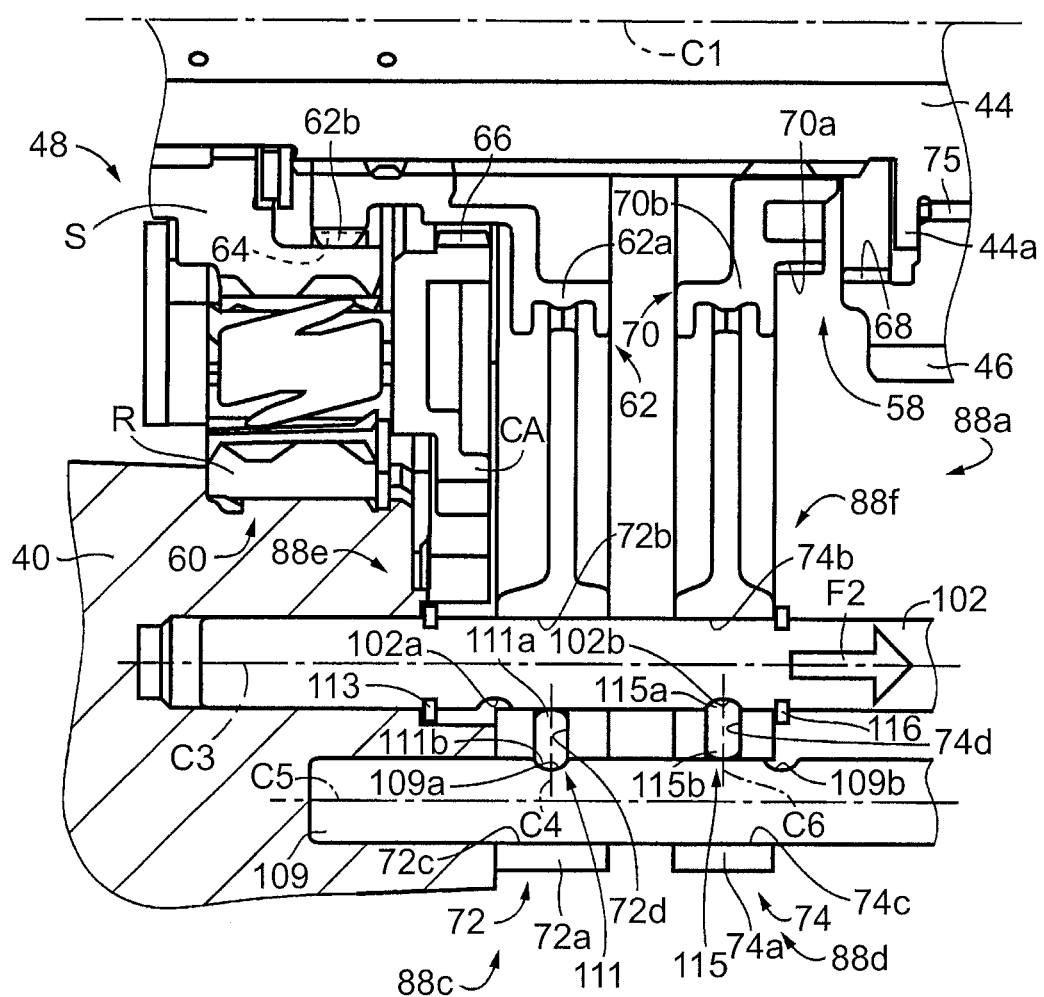
FIG. 7 is a sectional view illustrating a switching mechanism provided in the transfer, and shows a state in which the fork shaft is in the high gear position.
Figure 8:
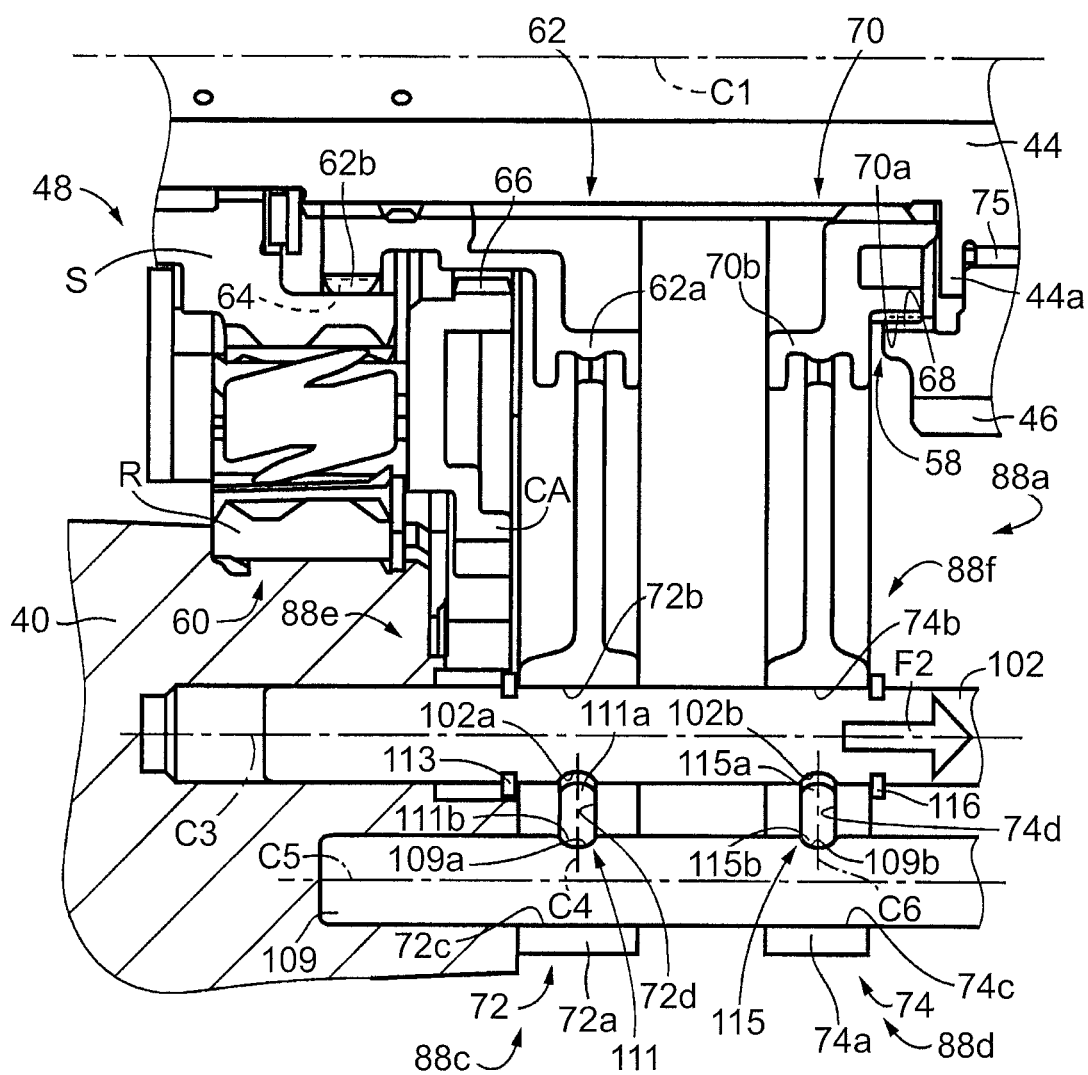
FIG. 8 is a sectional view illustrating the switching mechanism provided in the transfer, and shows a state in which the fork shaft is in the H4L position.
Figure 9:
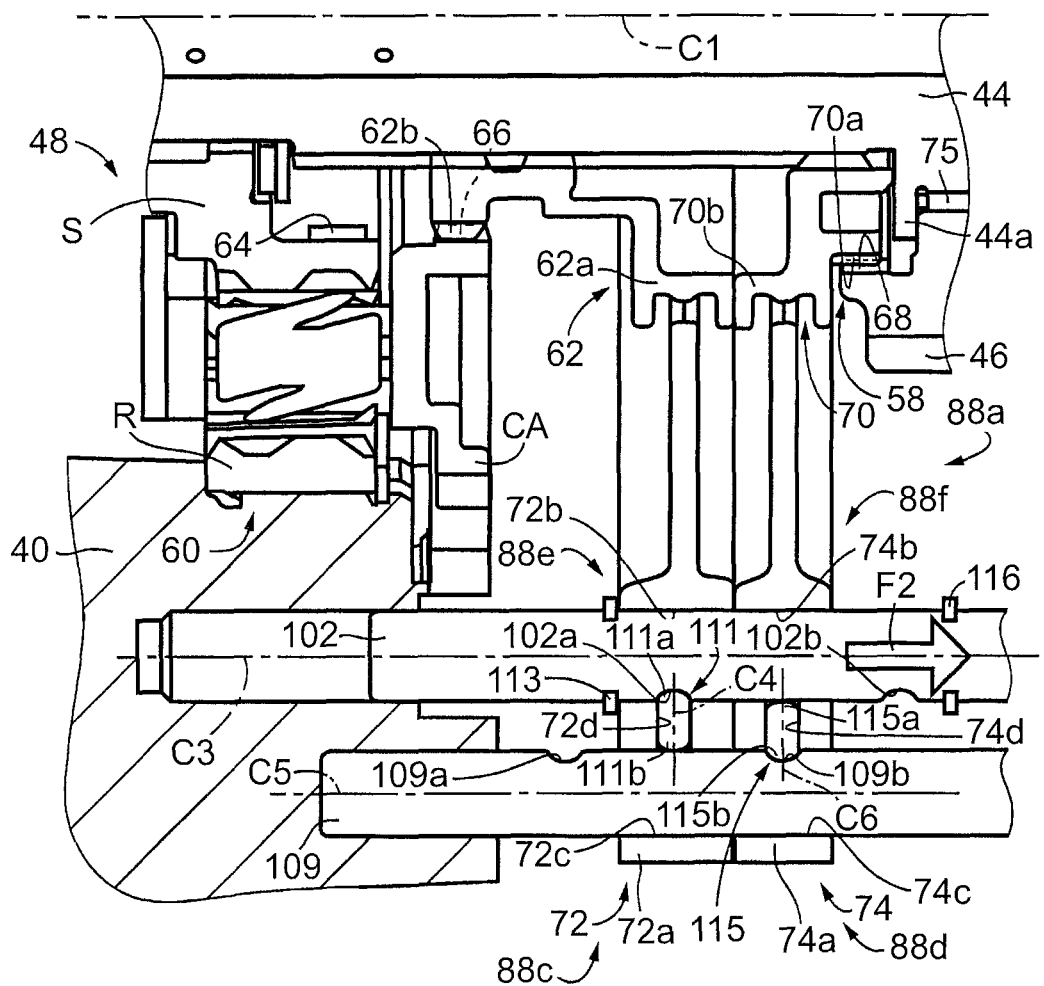
FIG. 9 is a sectional view illustrating the switching mechanism provided in the transfer, and shows a state in which the fork shaft is in the L4L position.

The first moving mechanism 88e includes a circular cylindrical-shaped fixed shaft 109, a pair of through-holes 72b and 72c, a circular cylindrical-shaped communication hole 72d, a circular cylindrical-shaped first interlocking member (interlocking member) 111, and an annular first stopper (stopper) 113, as shown in FIGS. 7 to 9. The fixed shaft 109 is fixed to the transfer case 40, parallel to the fork shaft 102. The pair of through-holes 72b and 72c pass in a circular cylindrical shape through a base end portion 72a of the high-low shift fork 72 to allow the high-low shift fork 72 to move in the direction of the third axis C3 along the fork shaft 102 and the fixed shaft 109. The communication hole 72d communicates the pair of through-holes 72b and 72c together in the base end portion 72a of the high-low shift fork 72. The first interlocking member 111 is arranged so as to be able to move in the direction of a fourth axis (axis) C4 of the communication hole 72d inside the communication hole 72d. One end portion 111a of the first interlocking member 111 is selectively engaged with a first recessed portion (recessed portion) 102a formed on an outer peripheral surface of the fork shaft 102, and the other end portion 111b of the first interlocking member 111 is selectively engaged with a first recessed portion (recessed portion) 109a formed on an outer peripheral surface of the fixed shaft 109. The first stopper 113 is fixed to the fork shaft 102 on the side opposite a 4WD locking fork 74 with respect to the high-low shift fork 72, and selectively moves the high-low shift fork 72 in the direction of the third axis C3 by the movement of the fork shaft 102 in the direction of the third axis C3. The third axis C3 of the fork shaft 102 is parallel to a fifth axis C5 of the fixed shaft 109.

Figure 10A:
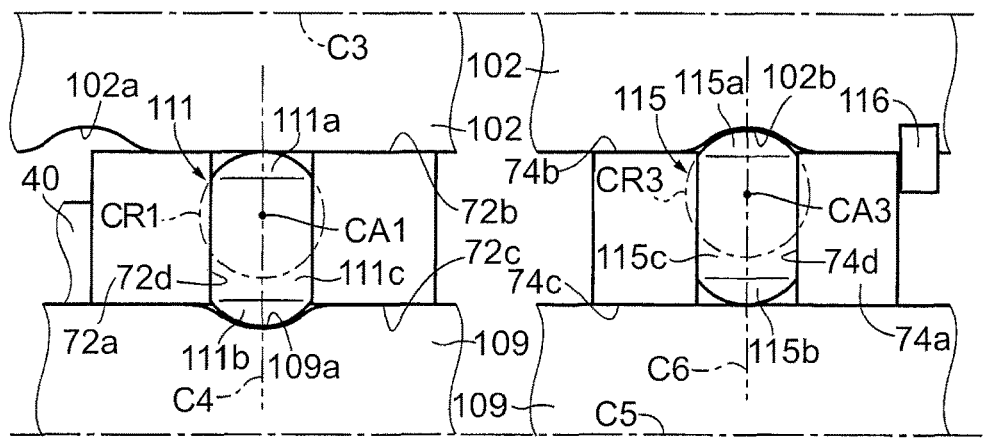
FIG. 10A is a sectional view illustrating a first interlocking member and a second interlocking member provided in the transfer, and is an enlarged view of FIG. 7 that shows the state in which the fork shaft is in the high gear position.
Figure 10B:
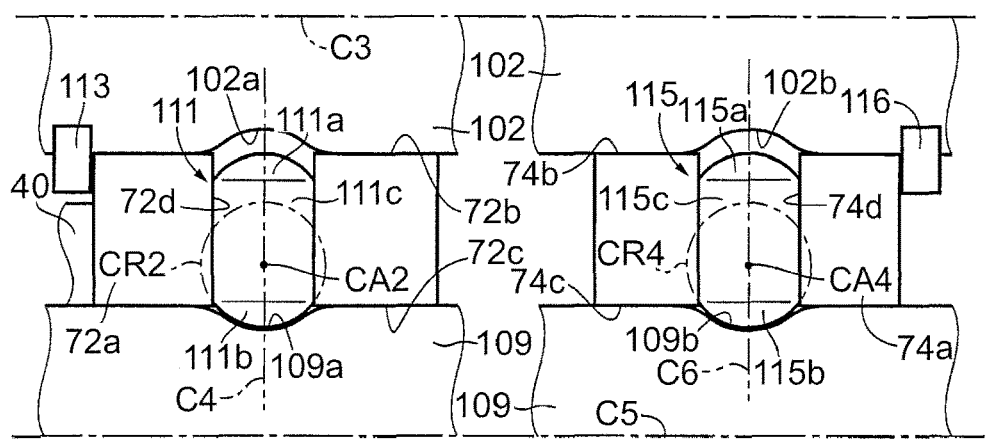
FIG. 10B is a sectional view illustrating the first interlocking member and the second interlocking member provided in the transfer, and is an enlarged view of FIG. 8 that shows the state in which the fork shaft is in the H4L position.
Figure 10C:
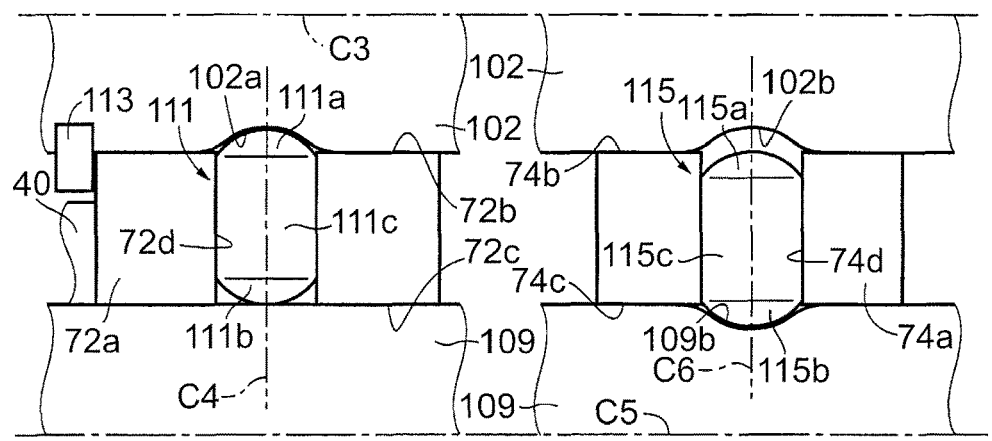
FIG. 10C is a sectional view illustrating the first interlocking member and the second interlocking member provided in the transfer, and is an enlarged view of FIG. 9 that shows the state in which the fork shaft is in the L4L position.

With the first interlocking member 111, the one end portion 111a on the fork shaft 102 side of the first interlocking member 111 and the other end portion 111b on the fixed shaft 109 side of the first interlocking member 111 are each formed having a spherical shape, and a circular cylindrical-shaped shaft portion 111c is integrally connected between the one end portion 111a and the other end portion 111b, as shown in FIGS. 7 to 10C. Also, a first recessed portion 102a formed on the fork shaft 102 is recessed in a spherical shape so as to receive the one end portion 111a on the fork shaft 102 side of the first interlocking member 111, and the first recessed portion 109a formed on the fixed shaft 109 is recessed in a spherical shape so as to receive the other end portion 111b on the fixed shaft 109 side of the first interlocking member 111. FIG. 7 is a view of a state when the fork shaft 102 is in the high gear position, FIG. 8 is a view of a state when the fork shaft 102 is in the H4L position, and FIG. 9 is a view of a state when the fork shaft 102 is in the L4L position. Also, FIGS. 10A to 10C are views illustrating the first interlocking member 111 and a second interlocking member 115 and the like, described later, with FIG. 10A being an enlarged view of FIG. 7 that shows the state in which the fork shaft 102 is in the high gear position, FIG. 10B being an enlarged view of FIG. 8 that shows the state in which the fork shaft 102 is in the H4L position, and FIG. 10C being an enlarged view of FIG. 9 that shows the state in which the fork shaft 102 is in the L4L position.

As shown in FIG. 10A, the one end portion 111a on the fork shaft 102 side of the first interlocking member 111 is formed such that a center of curvature CA1 of the spherical surface thereof is positioned between the one end portion 111a on the fork shaft 102 side of the first interlocking member 111 and the other end portion 111b on the fixed shaft 109 side of the first interlocking member 111, i.e., at the circular cylindrical-shaped shaft portion 111c. A circle CR1 formed by the alternate long and short dash line in FIG. 10A is the circle of curvature of the spherical surface of the one end portion 111a on the fork shaft 102 side of the first interlocking member 111. Also, as shown in FIG. 10C, the depth in the direction of the fourth axis C4 of the first recessed portion 102a of the fork shaft 102 is set such that, when the fork shaft 102 tries to move in the direction of the third axis C3 when the one end portion 111a on the fork shaft 102 side of the first interlocking member 111 is engaged with the first recessed portion 102a of the fork shaft 102, the inclined surface of the open edge portion of the first recessed portion 102a of the fork shaft 102 will abut against the inclined surface of the spherical surface of the one end portion 111a of the first interlocking member 111. Also, as shown in FIG. 10B, the other end portion 111b on the fixed shaft 109 side of the first interlocking member 111 is formed such that a center of curvature CA2 of the spherical surface thereof is positioned between the one end portion 111a on the fork shaft 102 side of the first interlocking member 111 and the other end portion 111b on the fixed shaft 109 side of the first interlocking member 111, i.e., at the circular cylindrical-shaped shaft portion 111c. A circle CR2 formed by the alternate long and short dash line in FIG. 10B is the circle of curvature of the spherical surface of the other end portion 111b on the fixed shaft 109 side of the first interlocking member 111. Also, as shown in FIG. 10B, the depth in the direction of the fourth axis C4 of the first recessed portion 109a of the fixed shaft 109 is set such that, when the high-low shift fork 72 tries to move in the direction of the third axis C3 by the fork shaft 102 moving in the direction of third axis C3 when the other end portion 111b on the fixed shaft 109 side of the first interlocking member 111 is engaged with the first recessed portion 109a of the fixed shaft 109, the inclined surface of the open edge portion of the first recessed portion 109a of the fixed shaft 109 will abut against the inclined surface of the spherical surface of the other end portion 111b of the first interlocking member 111.

Further, with the first interlocking member 111, the dimension in the direction of the fourth axis C4 of the first interlocking member 111 is set such that the other end portion 111b on the fixed shaft 109 side of the first interlocking member 111 and the first recessed portion 109a of the fixed shaft 109, and the one end portion 111a on the fork shaft 102 side of the first interlocking member 111 and the first recessed portion 102a of the fork shaft 102, alternately engage, as shown in FIGS. 8 and 9. Also, the position of the first stopper 113 fixed on the fork shaft 102 is arranged such that the first stopper 113 abuts against the base end portion 72a of the high-low shift fork 72 when the fork shaft 102 has moved from the high gear position to the H4L position, as shown in FIGS. 7 and 8. Also, the position of the first recessed portion 102a formed on the fork shaft 102 is designed such that the first recessed portion 102a is arranged on the fourth axis C4 of the communication hole 72d in the high-low shift fork 72 when the fork shaft 102 has moved from the high gear position to the H4L position, as shown in FIGS. 7 and 8.

Therefore, with the first moving mechanism 88e, when the fork shaft 102 is moved from the high gear position to the H4L position as shown in FIGS. 7 and 8, the fork shaft 102 passes through the through-hole 72b in the high-low shift fork 72, so the high-low shift fork 72 will not move in the direction of the third axis C3. That is, the outer peripheral teeth 62b of the high-low sleeve 62 that is connected to the high-low shift fork 72 remain in mesh with the high-side gear teeth 64. Also, when the fork shaft 102 is moved from the H4L position to the L4L position as shown in FIGS. 8 and 9, the first stopper 113 provided on the fork shaft 102 abuts against the base end portion 72a of the high-low shift fork 72, such that the high-low shift fork 72 moves in the direction of the third axis C3, and the outer peripheral teeth 62b of the high-low sleeve 62 that is connected to the high-low shift fork 72 mesh with the low-side gear teeth 66. When the first stopper 113 abuts against the base end portion 72a of the high-low shift fork 72 such that the high-low shift fork 72 moves toward the 4WD locking fork 74 side, and the inclined surface of the open edge portion of the first recessed portion 109a of the fixed shaft 109 abuts against the inclined surface of the spherical surface of the other end portion 111b on the fixed shaft 109 side of the first interlocking member

111, thrust in a direction toward the fork shaft 102 is generated in the other end portion 111*b* on the fixed shaft 109 side of the first interlocking member 111, such that the one end portion 111*a* on the fork shaft 102 side of the first interlocking member 111 engages with the first recessed portion 102*a* of the fork shaft 102.

Also, in the first moving mechanism 88*e*, when the fork shaft 102 is moved from the L4L position to the H4L position as shown in FIGS. 9 and 8, the high-low shift fork 72 moves in the direction of the third axis C3 by the first interlocking member 111, and the outer peripheral teeth 62*b* of the high-low sleeve 62 that is connected to the high-low shift fork 72 mesh with the high-side gear teeth 64. When the fork shaft 102 moves from the L4L position to the H4L position and the inclined surface of the open edge portion of the first recessed portion 102*a* of the fork shaft 102 abuts against the inclined surface of the spherical surface of the one end portion 111*a* on the fork shaft 102 side of the first interlocking member 111, thrust in the direction toward the fixed shaft 109 is generated in the one end portion 111*a* on the fork shaft 102 side of the first interlocking member 111, such that the other end portion 111*b* on the fixed shaft 109 side of the first interlocking member 111 engages with the first recessed portion 109*a* of the fixed shaft 109. Also, when the fork shaft 102 is moved from the L4L position to the H4L position, thrust in the direction toward the fixed shaft 109 is generated in the one end portion 111*a* on the fork shaft 102 side of the first interlocking member 111, but the other end portion 111*b* on the fixed shaft 109 side of the first interlocking member 111 abuts against the outer peripheral surface of the fixed shaft 109, so the one end portion 111*a* on the fork shaft 102 side of the first interlocking member 111 remains engaged with the first recessed portion 102*a* of the fork shaft 102. Also, even if the fork shaft 102 is moved from the H4L position to the high gear position as shown in FIGS. 8 and 7, the fork shaft 102 passes through the through-hole 72*b* in the high-low shift fork 72, so the high-low shift fork 72 will not move in the direction of the third axis C3. That is, the outer peripheral teeth 62*b* of the high-low sleeve 62 that is connected to the high-low shift fork 72 remain in mesh with the high-side gear teeth 64.

Also, as shown in FIGS. 2 to 5, the third transmitting mechanism 88*d* includes the 4WD locking fork 74 that is provided on the fork shaft 102 and is connected to a fork connecting portion 70*b* of the locking sleeve 70, and a second moving mechanism 88*f* that selectively transmits the movement of the fork shaft 102 in the direction of the third axis C3 to the 4WD locking fork 74, and selectively moves the 4WD locking fork 74 in the direction of the third axis C3, i.e., selectively moves the locking sleeve 70 in the direction of the first axis C1.

The second moving mechanism 88*f* includes the fixed shaft 109, a pair of through-holes 74*b* and 74*c*, a circular cylindrical-shaped communication hole 74*d*, a circular cylindrical second interlocking member (interlocking member) 115, and an annular second stopper (stopper) 116, as shown in FIGS. 7 to 9. The pair of through-holes 74*b* and 74*c* pass in a circular cylindrical shape through a base end portion 74*a* of the 4WD locking fork 74 to allow the 4WD locking fork 74 to move in the direction of the third axis C3 along the fork shaft 102 and the fixed shaft 109. The communication hole 74*d* communicates the pair of through-holes 74*b* and 74*c* together in the base end portion 74*a* of the 4WD locking fork 74. The second interlocking member 115 is arranged so as to be able to move in the direction of a sixth axis (axis) C6 of the communication hole 74*d* inside the communication hole 74*d*. One end portion 115*a* of the second interlocking member 115 is selectively engaged with a second recessed portion (recessed portion) 102*b* formed on an outer peripheral surface of the fork shaft 102, and the other end portion 115*b* of the second interlocking member 115 is selectively engaged with a second recessed portion (recessed portion) 109*b* formed on an outer peripheral surface of the fixed shaft 109. The second stopper 116 is fixed to the fork shaft 102 on the side opposite the high-low shift fork 72 side with respect to the 4WD locking fork 74, and selectively moves the 4WD locking fork 74 in the direction of the third axis C3 by the movement of the fork shaft 102 in the direction of the third axis C3.

With the second interlocking member 115, the one end portion 115*a* on the fork shaft 102 side of the second interlocking member 115 and the other end portion 115*b* on the fixed shaft 109 side of the second interlocking member 115 are each formed having a spherical shape, and a circular cylindrical-shaped shaft portion 115*c* is integrally connected between the one end portion 115*a* and the other end portion 115*b*, as shown in FIGS. 7 to 10C. Also, the second recessed portion 102*b* formed on the fork shaft 102 is recessed in a spherical shape so as to receive the one end portion 115*a* on the fork shaft 102 side of the second interlocking member 115, and the second recessed portion 109*b* formed on the fixed shaft 109 is recessed in a spherical shape so as to receive the other end portion 115*b* on the fixed shaft 109 side of the second interlocking member 115.

As shown in FIG. 10A, the one end portion 115*a* on the fork shaft 102 side of the second interlocking member 115 is formed such that a center of curvature CA3 of the spherical surface thereof is positioned between the one end portion 115*a* on the fork shaft 102 side of the second interlocking member 115 and the other end portion 115*b* on the fixed shaft 109 side of the second interlocking member 115, i.e., at the circular cylindrical-shaped shaft portion 115*c*. A circle CR3 formed by the alternate long and short dash line in FIG. 10A is the circle of curvature of the spherical surface of the one end portion 115*a* on the fork shaft 102 side of the second interlocking member 115. Also, as shown in FIG. 10A, the depth in the direction of the sixth axis C6 of the second recessed portion 102*b* of the fork shaft 102 is set such that, when the fork shaft 102 tries to move in the direction of the third axis C3 when the one end portion 115*a* on the fork shaft 102 side of the second interlocking member 115 is engaged with the second recessed portion 102*b* of the fork shaft 102, the inclined surface of the open edge portion of the second recessed portion 102*b* of the fork shaft 102 will abut against the inclined surface of the spherical surface of the one end portion 115*a* of the second interlocking member 115. Also, as shown in FIG. 10B, the other end portion 115*b* on the fixed shaft 109 side of the second interlocking member 115 is formed such that a center of curvature CA4 of the spherical surface thereof is positioned between the one end portion 115*a* on the fork shaft 102 side of the second interlocking member 115 and the other end portion 115*b* on the fixed shaft 109 side of the second interlocking member 115, i.e., at the circular cylindrical-shaped shaft portion 115*c*. A circle CR4 formed by the alternate long and short dash line in FIG. 10B is the circle of curvature of the spherical surface of the other end portion 115*b* on the fixed shaft 109 side of the second interlocking member 115. Also, as shown in FIG. 10B, the depth in the direction of the sixth axis C6 of the second recessed portion 109*b* of the fixed shaft 109 is set such that, when the 4WD locking fork 74 tries to move in the direction of the third axis C3 by the fork shaft 102 moving in the direction of third axis C3 when the other end portion 115*b* on the fixed shaft 109 side of the second interlocking member 115 is engaged with the second recessed portion 109b of the fixed shaft 109, the inclined surface of the open edge portion of the second recessed portion 109b of the fixed shaft 109 will abut against the inclined surface of the spherical surface of the other end portion 115b of the second interlocking member 115.

Further, with the second interlocking member 115, the dimension in the direction of the sixth axis C6 of the second interlocking member 115 is set such that the other end portion 115b on the fixed shaft 109 side of the second interlocking member 115 and the second recessed portion 109b of the fixed shaft 109, and the one end portion 115a on the fork shaft 102 side of the second interlocking member 115 and the second recessed portion 102b of the fork shaft 102, alternately engage, as shown in FIGS. 8 and 9. The position of the second stopper 116 fixed on the fork shaft 102 is arranged such that the second stopper 116 abuts against the base end portion 74a of the 4WD locking fork 74 when the fork shaft 102 has moved from the L4L position to the H4L position, as shown in FIGS. 9 and 8. Also, the position of the second recessed portion 102b formed on the fork shaft 102 is designed such that the second recessed portion 102b is arranged on the sixth axis C6 of the communication hole 74d in the 4WD locking fork 74 when the fork shaft 102 has moved from the L4L position to the H4L position, as shown in FIGS. 9 and 8.

Therefore, with the second moving mechanism 88f, when the fork shaft 102 is moved from the high gear position to the H4L position as shown in FIGS. 7 and 8, the 4WD locking fork 74 moves in the direction of the third axis C3 by the second interlocking member 115, and the meshing teeth 70a of the locking sleeve 70 that is connected to the 4WD locking fork 74 mesh with the locking teeth 68. When the fork shaft 102 is moved from the high gear position to the H4L position, and the inclined surface of the open edge portion of the second recessed portion 102b of the fork shaft 102 abuts against the inclined surface of the spherical surface of the one end portion 115a on the fork shaft 102 side of the second interlocking member 115, as shown in FIGS. 10A and 10B, thrust in the direction toward the fixed shaft 109 is generated in the one end portion 115a on the fork shaft 102 side of the second interlocking member 115, and the other end portion 115b on the fixed shaft 109 side of the second interlocking member 115 engages with the second recessed portion 109b of the fixed shaft 109. Also, when the fork shaft 102 is moved from the high gear position to the H4L position, thrust in the direction toward the fixed shaft 109 is generated in the one end portion 115a on the fork shaft 102 side of the second interlocking member 115, but the other end portion 115b on the fixed shaft 109 side of the second interlocking member 115 abuts against the outer peripheral surface of the fixed shaft 109, so the one end portion 115a on the fork shaft 102 side of the second interlocking member 115 remains in mesh with the second recessed portion 102b of the fork shaft 102. Also, even if the fork shaft 102 is moved from the H4L position to the L4L position as shown in FIGS. 8 and 9, the fork shaft 102 passes through the through-hole 74b in the 4WD locking fork 74, so the 4WD locking fork 74 will not move in the direction of the third axis C3. That is, the meshing teeth 70a of the locking sleeve 70 that is connected to the 4WD locking fork 74 remain in mesh with the locking teeth 68.

Also, in the second moving mechanism 88f, even if the fork shaft 102 is moved from the L4L position to the H4L position as shown in FIGS. 9 and 8, the fork shaft 102 passes through the through-hole 74b in the 4WD locking fork 74, so the 4WD locking fork 74 will not move in the direction of the third axis C3. That is, the meshing teeth 70a of the locking sleeve 70 that is connected to the 4WD locking fork 74 remain in mesh with the locking teeth 68. Also, when the fork shaft 102 is moved from the H4L position to the high gear position as shown in FIGS. 8 and 7, the second stopper 116 provided on the fork shaft 102 abuts against the base end portion 74a of the 4WD locking fork 74, so the 4WD locking fork 74 moves in the direction of the third axis C3 and the meshing teeth 70a of the locking sleeve 70 that is connected to the 4WD locking fork 74 come out of mesh with the locking teeth 68. When the second stopper 116 abuts against the base end portion 74a of the 4WD locking fork 74 and the 4WD locking fork 74 moves toward the high-low shift fork 72 side, and the inclined surface of the open edge portion of the second recessed portion 109b of the fixed shaft 109 abuts against the inclined surface of the spherical surface of the other end portion 115b on the fixed shaft 109 side of the second interlocking member 115, thrust in a direction toward the fork shaft 102 is generated in the other end portion 115b on the fixed shaft 109 side of the second interlocking member 115, and the one end portion 115a on the fork shaft 102 side of the second interlocking member 115 engages with the second recessed portion 102b of the fork shaft 102.

As described above, in the first moving mechanism 88e and the second moving mechanism 88f provided in the switching mechanism 88a, when the fork shaft 102 moves from the high gear position to the H4L position, the second interlocking member 115 engages the fork shaft 102 and the 4WD locking fork 74 so that they are unable to move relative to one another, and the movement of the fork shaft 102 in the direction of the third axis C3 is transmitted to the 4WD locking fork 74. Also, when the fork shaft 102 moves from the H4L position to the L4L position, the first stopper 113 engages with the fork shaft 102 and the high-low shift fork 72, such that the movement of the fork shaft 102 in the direction of the third axis C3 is transmitted to the high-low shift fork 72. Also, when the fork shaft 102 moves from the L4L position to the H4L position, the first interlocking member 111 engages the fork shaft 102 and the high-low shift fork 72 so that they are unable to move relative to one another, and the movement of the fork shaft 102 in the direction of the third axis C3 is transmitted to the high-low shift fork 72. Further, when the fork shaft 102 moves from the H4L position to the high gear position, the second stopper 116 engages the fork shaft 102 and the 4WD locking fork 74, such that the movement of the fork shaft 102 in the direction of the third axis C3 is transmitted to the 4WD locking fork 74. Therefore, the first moving mechanism 88e and the second moving mechanism 88f have an interlocking function that alternately transmits the movement of the fork shaft 102 in the direction of the third axis C3 to the high-low shift fork 72 or the 4WD locking fork 74, by alternately engaging the fork shaft 102 with the high-low shift fork 72, and the fork shaft 102 with the 4WD locking fork 74, by the first stopper 113 and the second stopper 116, and the first interlocking member 111 and the second interlocking member 115.

With the transfer 22 structured as described above, when the drum cam 100 is rotated in the direction of arrow F1 around the first axis C1 via the screw mechanism 86 by rotatably driving the electric motor 84, such that the cam engaging member 103 moves in the direction of arrow F2 from the first cam groove portion 100e to the second cam groove portion 100g along the first inclined cam groove portion 100d as shown in FIGS. 6A and 6B, the fork shaft 102 that is connected to the cam engaging member 103 moves from the high gear position to the H4L position, and the locking sleeve 70 switches from the high gear position to the H4L position as shown in FIGS. 7 and 8. Also, when the drum cam 100 is rotated even further in the direction of arrow F1 around the first axis C1 via the screw mechanism 86 by further rotatably driving the electric motor 84, such that the cam engaging member 103 moves in the direction of arrow F2 from the second cam groove portion 100g to the third cam groove portion 100h along the second inclined cam groove portion 100f as shown in FIGS. 6B and 6C, the fork shaft 102 that is connected to the cam engaging member 103 moves from the H4L position to the L4L position, and the high-low sleeve 62 switches from the H4L position to the L4L position as shown in FIGS. 8 and 9.

Also, when the drum cam 100 is rotated in the direction opposite the direction of arrow F1 around the first axis C1 via the screw mechanism 86 by rotatably driving the electric motor 84, such that the cam engaging member 103 moves in the direction opposite the direction of arrow F2 from the third cam groove portion 100h to the second cam groove portion 100g along the second inclined cam groove portion 100f as shown in FIGS. 6C and 6B, the fork shaft 102 that is connected to the cam engaging member 103 moves from the L4L position to the H4L position, and the high-low sleeve 62 switches from the L4L position to the H4L position as shown in FIGS. 9 and 8. Also, when the drum cam 100 is rotated even further in the direction opposite the direction of arrow F1 around the first axis C1 via the screw mechanism 86 by further rotatably driving the electric motor 84, such that the cam engaging member 103 moves in the direction opposite the direction of arrow F2 from the second cam groove portion 100g to the first cam groove portion 100e along the first inclined cam groove portion 100d as shown in FIGS. 6B and 6A, the fork shaft 102 that is connected to the cam engaging member 103 moves from the H4L position to the high gear position, and the locking sleeve 70 switches from the H4L position to the high gear position as shown in FIGS. 8 and 7.

The standby mechanism 106 includes two flanged cylindrical members 108a and 108b, a cylindrical spacer 110, a spring member 112, and a grasping member 114, as shown in FIG. 5. The two flanged cylindrical members 108a and 108b are arranged around the third axis C3 and are able to slide on the fork shaft 102 in a direction parallel to the third axis C3. The two flanged cylindrical members 108a and 108b are arranged such that a flange provided on one end portion of the flanged cylindrical member 108a faces a flange provided on one end portion of the flanged cylindrical member 108b. The spacer 110 is interposed between the two flanged cylindrical members 108a and 108b. The spring member 112 is arranged in a preloaded state on the outer peripheral side of the spacer 110. The grasping member 114 grasps the two flanged cylindrical members 108a and 108b in a manner that enables the two flanged cylindrical members 108a and 108b to slide in a direction parallel to the third axis C3. The grasping member 114 slides the flanged cylindrical members 108a and 108b on the fork shaft 102 by abutting against the flanges of the flanged cylindrical members 108a and 108b. The length between the flanges of the flanged cylindrical members 108a and 108b when the flanges are both abutted against the grasping member 114 is longer than the length of the spacer 110. Therefore, the state in which the flanges are both abutted against the grasping member 114 is created by the urging force of the spring member 112. Also, the standby mechanism 106 has stoppers 118a and 118b that stop the flanged cylindrical members 108a and 108b, respectively, from sliding apart in the direction parallel to the third axis C3, on the outer peripheral surface of the fork shaft 102. Stopping the flanged cylindrical members 108a and 108b from sliding apart with the stoppers 118a and 118b enables the linear motion force in the direction of the third axis C3 of the cam engaging member 103 to be transmitted to the high-low switching mechanism 48 and the 4WD locking mechanism 58 via the fork shaft 102.

The friction engagement element 80 of the front-wheel drive clutch 50 is pushed on by the piston 82 when the fork shaft 102 is in the high gear position, and is not pushed on by the piston 82 when the fork shaft 102 is in the H4L position and the L4L position. When the fork shaft 102 is in the high gear position, the length between the flanges of the flanged cylindrical members 108a and 108b is able to be changed between the length when the flanges are both in a state abutted against the grasping member 114, and the length of the spacer 110. Therefore, the standby mechanism 106 allows the nut member 92 to move in the direction parallel to the first axis C1, between a position in which the friction engagement element 80 of the front-wheel drive clutch 50 is pressed on by the piston 82 and a position in which the friction engagement element 80 of the front-wheel drive clutch 50 is not pressed on by the piston 82, while the fork shaft 102 remains in the high gear position.

Returning now to FIG. 1, an electronic control unit (ECU) 200 that includes a control apparatus of the vehicle 10 that switches between 2WD and 4WD, for example, is provided in the vehicle 10. The ECU 200 includes a so-called microcomputer that includes, for example, a CPU, RAM, ROM, and an input/output interface and the like. The CPU executes various controls of the vehicle 10 by processing signals according to a program stored in advance in the ROM, while using the temporary storage function of the RAM. For example, the ECU 200 executes output control of the engine 12, and switching control to switch the driving state of the vehicle 10, and the like, and is divided into sections for engine control and driving state control and the like as necessary. As shown in FIG. 1, various actual values based on detection signals from various sensors provided in the vehicle 10 are supplied to the ECU 200. Examples of such actual values include an engine speed Ne, a motor rotation angle θm, wheel speeds Nwfl, Nwfr, Nwrl, and Nwrr of the front wheels 14L and 14R and the rear wheels 16L and 16R, an accelerator operation amount θacc, an H-range request Hon that is a signal indicating that an H-range selector switch 210 has been operated, a 4WD request 4WDon that is a signal indicating that a 4WD selector switch 212 has been operated, and LOCKon that is a signal indicating that a 4WD lock selector switch 214 has been operated, and the like. Examples of the various sensors include an engine speed sensor 202, a motor rotation angle sensor 204, wheel speed sensors 206, an accelerator operation amount sensor 208, a H-range selector switch 210 for selecting the high-speed gear H in response to an operation by the driver, a 4WD selector switch 212 for selecting 4WD in response to an operation by the driver, and a 4WD lock selector switch 214 for selecting the 4WD locked state in response to an operation by the driver, and the like. Various signals, for example, an engine output control command signal Se for output control of the engine 12, an operation command signal Sd for switching the state of the front-side clutch 36, and a motor drive command signal Sm for controlling the rotation amount of the electric motor 84, and the like, are output from the ECU 200 to an output control apparatus of the engine 12, an actuator of the front-side clutch 36, and the electric motor 84 and the like, respectively, as shown in FIG. 1.

In the vehicle 10 structured as described above, the amount of movement (i.e., the stroke) of the nut member 92 is controlled by controlling the rotation amount of the electric motor 84. When the fork shaft 102 is in the high gear position, the position in which the front-wheel drive clutch 50 is placed in the released state by driving the electric motor 84 a predetermined rotation amount to move the nut member 92 by a predetermined stroke amount toward the non-pressing side from a position in which the piston 82 is abutted against the friction engagement element 80, is a position (hereinafter referred to as an "H2 position") that places the vehicle 10 in the 2WD running state in which only the rear wheels 16 are driven in the high-speed gear H. When the front-side clutch 36 is placed in the released state when the piston 82 is in this H2 position, rotation is not transmitted from either the engine 12 side or the front wheel 14 side, to the rotating elements (e.g., the drive gear 46, the front-wheel drive chain 56, the driven gear 54, the front-wheel side output shaft 52, the front propeller shaft 24, and the front wheel differential gear unit 28) that form the power transmitting path from the drive gear 46 to the front wheel differential gear unit 28, when running in 2WD. Therefore, when running in 2WD, these rotating elements are stopped from rotating and thus are prevented from being dragged along, so running resistance is reduced.

Also, as shown in FIGS. 2 and 7, when the fork shaft 102 is in the high gear position, the position in which the front-wheel drive clutch 50 is placed in the slip state by controlling the rotation amount of the electric motor 84 to move the nut member 92 toward the pressing side from the position where the piston 82 abuts against the friction engagement element 80, is a position (hereinafter referred to as an "H4 position") that places the vehicle 10 in the 4WD running state in which power is transmitted to both the front wheels 14 and the rear wheels 16 in the high-speed gear H. When the piston 82 is in this H4 position, torque distribution between the front wheels 14 and the rear wheels 16 is adjusted as necessary by controlling the transfer torque of the front-wheel drive clutch 50 according to the pressure of the piston 82.

Also, with the vehicle 10 structured as described above, the amount of movement (the stroke) of the cam engaging member 103, i.e., the fork shaft 102, is controlled by controlling the rotation amount of the nut member 92, i.e., the rotation amount of the drum cam 100, which is achieved by controlling the rotation amount of the electric motor 84. That is, the fork shaft 102 is moved to the high gear position, the H4L position, and the L4L position, such that the high-low sleeve 62 and the locking sleeve 70 switch to the high gear position, the H4L position, and the L4L position, by controlling the rotation amount of the electric motor 84.

As described above, according to this example embodiment, the switching mechanism 88a is provided in which the high-low sleeve 62 and the locking sleeve 70 are selectively switched between the H4L position in which the high-speed gear H is established in the high-low switching mechanism 48 and the rear-wheel side output shaft 44 and the drive gear 46 are locked together, and the L4L position in which the low-speed gear L is established in the high-low switching mechanism 48 and the rear-wheel side output shaft 44 and the drive gear 46 are locked together, in conjunction with the rotational motion of the electric motor 84. Therefore, if the front-wheel drive clutch 50 fails and transfer torque to the front wheels 14 is no longer able to be adjusted, for example, the high-low sleeve 62 and the locking sleeve 70 are switched to the H4L position by the switching mechanism 88a, such that the high-speed gear H is established in the high-low switching mechanism 48 and the rear-wheel side output shaft 44 and the drive gear 46 are locked together, thereby enabling the vehicle 10 to run in 4WD at medium to high speed in a desert, for example, as well as improving controllability of the vehicle 10 on slopes with a low μ, for example.

Also, according to this example embodiment, the first moving mechanism 88e and the second moving mechanism 88f of the switching mechanism 88a include i) the 4WD locking fork 74 that transmits the movement of the fork shaft 102 in the direction of the third axis C3 to the locking sleeve 70, ii) the fixed shaft 109 that is arranged parallel to the fork shaft 102, iii) the pairs of through-holes 72b and 72c, and 74b and 74c, that pass through the high-low shift fork 72 and the 4WD locking fork 74 to allow the high-low shift fork 72 and the 4WD locking fork 74 to move in the direction of the third axis C3 on the fork shaft 102 and the fixed shaft 109, iv) the communication holes 72d and 74d that communicate these pairs of through-holes 72b and 72c, and 74b and 74c, respectively, together, v) the first interlocking member 111 and the second interlocking member 115 that are arranged so as to be able to move in the directions of the fourth axis C4 and the sixth axis C6 of the communication holes 72d and 74d inside the communication holes 72d and 74d, and in which the one end portions 111a and 115a are selectively engaged with the first recessed portion 102a and the second recessed portion 102b, respectively, formed on the fork shaft 102, and the other end portions 111b and 115b are selectively engaged with the first recessed portion 109a and the second recessed portion 109b, respectively, formed on the fixed shaft 109, and vi) the first stopper 113 and the second stopper 116 that are formed on the fork shaft 102 and selectively move the high-low shift fork 72 and the 4WD locking fork 74 in the direction of the third axis C3 by the movement of the fork shaft 102 in the direction of the third axis C3. The first moving mechanism 88e and the second moving mechanism 88f of the switching mechanism 88a have an interlocking function that alternately engages the fork shaft 102 and the high-low shift fork 72, and the fork shaft 102 and the 4WD locking fork 74, by the first stopper 113 and the second stopper 116, and the first interlocking member 111 and the second interlocking member 115, and thus alternately transmits the movement of the fork shaft 102 to the high-low shift fork 72 or the 4WD locking fork 74. Therefore, in the first moving mechanism 88e and the second moving mechanism 88f of the switching mechanism 88a, the fork shaft 102 and the high-low shift fork 72, and the fork shaft 102 and the 4WD locking fork 74, are alternately engaged by the first stopper 113 and the second stopper 116, and the first interlocking member 111 and the second interlocking member 115, such that the movement of the fork shaft 102 is alternately transmitted to the high-low shift fork 72 or the 4WD locking fork 74. As a result, the distance between the rear-wheel side output shaft 44 and the fork shaft 102 is able to be shortened by the drum cam not being provided on the fork shaft, and thus the transfer 22 is able to be smaller than a transfer that selectively switches the high-low sleeve and the locking sleeve between the H4L position and the L4L position by adding the drum cam to the fork shaft and rotating the fork shaft and the drum cam, for example.

Also, according to this example embodiment, the second support bearing 73 that rotatably supports the end portion on the drum cam 100, from among both end portions of the rear-wheel side output shaft 44, is arranged inside of the drum cam 100 within the length range of the drum cam 100 in the direction of the first axis C1 of the rear-wheel side output shaft 44, so the length of the dimension of the transfer 22 in the direction of the first axis C1 of the rear-wheel side output shaft 44 is suitably short.

Also, according to this example embodiment, the transfer 22 includes the cam engaging member 103 that is connected to the fork shaft 102, and the cam groove 100c that engages with the cam engaging member 103 and moves the cam engaging member 103 in the direction of the third axis C3 of the fork shaft 102 by rotating around the first axis C1 of the rear-wheel side output shaft 44, is formed on the drum cam 100. The cam groove 100c formed on the drum cam 100 includes the first inclined cam groove portion 100d and the second inclined cam groove portion 100f that extend in a direction inclined with respect to the first axis C1 of the rear-wheel side output shaft 44. When the drum cam 100 is rotated around the first axis C1 of the rear-wheel side output shaft 44 as the nut member 92 is rotated around the first axis C1 of the rear-wheel side output shaft 44 by the electric motor 84, the cam engaging member 103 is moved along the first inclined cam groove portion 100d and the second inclined cam groove portion 100f of the drum cam 100 in the direction of the third axis C3 of the fork shaft 102 by the amount of movement D that is greater than the amount of movement of the nut member 92 in the direction of the first axis C1 of the rear-wheel side output shaft 44. Therefore, the responsiveness when the high-low switching mechanism 48 switches between the high-speed gear H and the low-speed gear L is significantly improved compared to when the switch between the high-speed gear H and the low-speed gear L is achieved by the nut member 92 of the screw mechanism 86 moving in the direction of the first axis C1 of the rear-wheel side output shaft 44, for example.

Also, according to this example embodiment, the nut member 92 screws together with the threaded shaft member 94 via the plurality of balls 96. Therefore, the relative rotation between the nut member 92 and the threaded shaft member 94 is smoother, so the power required of the electric motor 84 during operation is stably reduced.

Further, according to this example embodiment, the cam engaging member 103 transmits the movement thereof in the direction of the first axis C1 of the rear-wheel side output shaft 44 to the fork shaft 102 via the spring member 112 of the standby mechanism 106. Therefore, when the high-low switching mechanism 48 switches between the high-speed gear H and the low-speed gear L, shock that accompanies the switch of the high-low switching mechanism 48 is absorbed by the spring member 112.

Next, another example embodiment will be described. Portions common to the first example embodiment described above will be denoted by the same reference characters, and descriptions of these portions will be omitted.

Figure 11:
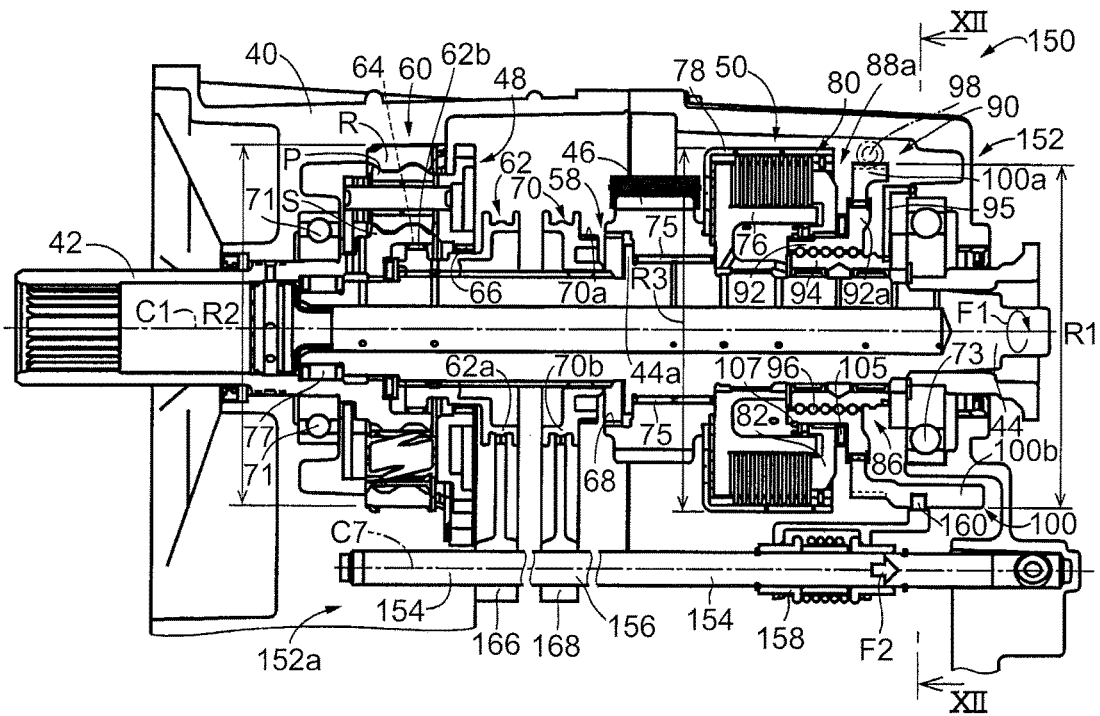
FIG. 11 is a view of a transfer according to another example embodiment.

FIG. 11 is a view illustrating a transfer 150 according to another example embodiment. The transfer 150 according to this example embodiment differs from the transfer 22 of the first example embodiment in that a switching mechanism 152a of a transmitting mechanism 152 is different from the switching mechanism 88a of the transmitting mechanism 88 of the first example embodiment. Aside from this, the transfer 150 is substantially similar to the transfer 22 of the first example embodiment.

The transmitting mechanism 152 includes the switching mechanism 152a that selectively switches, in conjunction with the rotational motion of the electric motor 84, the high-low sleeve 62 and the locking sleeve 70 among three positions, i.e., an H4L position in which the high-speed gear H is established in the high-low switching mechanism 48 and the rear-wheel side output shaft 44 and the drive gear 46 are locked together, an L4L position in which the low-speed gear L is established in the high-low switching mechanism 48 and the rear-wheel side output shaft 44 and the drive gear 46 are locked together, and a high gear (H4 or H2) position in which the high-speed gear H is established in the high-low switching mechanism 48 and the rear-wheel side output shaft 44 and the drive gear 46 are not locked together. Also, the transmitting mechanism 152 is provided with a first transmitting mechanism (transmitting mechanism) 152b that is similar to the first transmitting mechanism 88b of the first example embodiment, which transmits the linear motion of the nut member 92 of the screw mechanism 86 to the front-wheel drive clutch 50.

Figure 12:
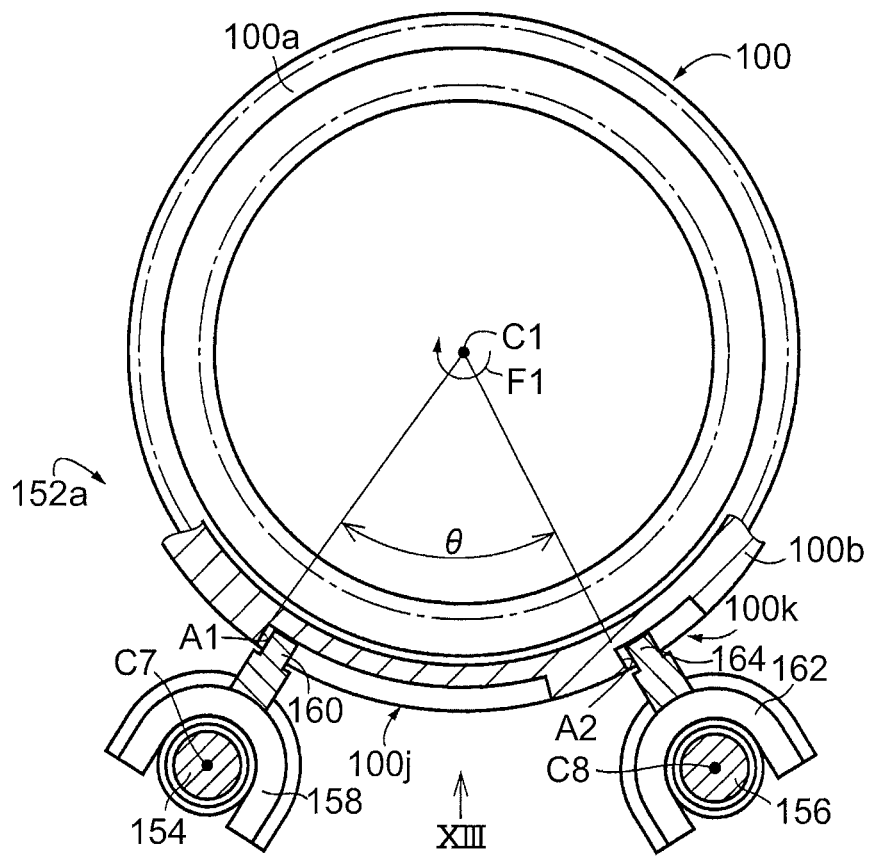
FIG. 12 is a sectional view taken along line XII-XII in FIG. 11.

The switching mechanism 152a includes a first fork shaft (second shaft) 154 and a second fork shaft 156, a first cam engaging member 160, a second cam engaging member 164, a drum cam 100, a high-low shift fork 166, and a 4WD locking fork 168, as shown in FIGS. 11 and 12. The first fork shaft 154 and the second fork shaft 156 are arranged parallel to the rear-wheel side output shaft 44 and are supported by the transfer case 40 in a manner able to move in the direction of the first axis C1. The first cam engaging member 160 is connected to the first fork shaft 154 via a first standby mechanism 158. The second cam engaging member 164 is connected to the second fork shaft 156 via a second standby mechanism 162. The drum cam 100 has two cam grooves, i.e., a first cam groove 100j and a second cam groove 100k, formed on an outer periphery thereof. The first cam groove 100j engages with the first cam engaging member 160 and moves the first cam engaging member 160 in the direction of a seventh axis (axis) C7 of the first fork shaft 154 by rotating around the first axis C1 of the rear-wheel side output shaft 44. The second cam groove 100k engages with the second cam engaging member 164 and moves the second cam engaging member 164 in the direction of an eighth axis (axis) C8 of the second fork shaft 156 by rotating around the first axis C1 of the rear-wheel side output shaft 44. The high-low shift fork 166 is integrally fixed to the first fork shaft 154, and is connected to the fork connecting portion 62a of the high-low sleeve 62. The 4WD locking fork 168 is integrally fixed to the second fork shaft 156, and is connected to the fork connecting portion 70b of the locking sleeve 70. The seventh axis C7 of the first fork shaft 154 and the eighth axis C8 of the second fork shaft 156 are parallel to the first axis C1 of the rear-wheel side output shaft 44. Also, the first standby mechanism 158 and the second standby mechanism 162 both have structures similar to that of the standby mechanism 106 of the first example embodiment, so in this example embodiment, a description of the structures of the first standby mechanism 158 and the second standby mechanism 162 will be omitted.

Figure 13:
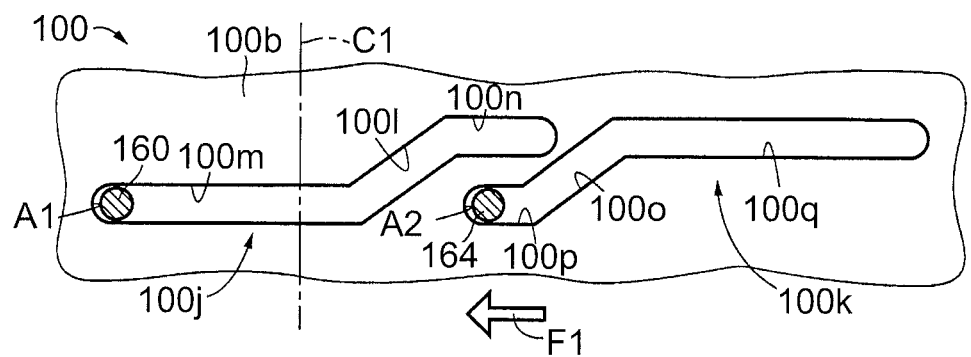
FIG. 13 is a view of a first cam groove and a second cam groove viewed from the direction of arrow XIII in FIG. 12.

As shown in FIG. 13, the first cam groove 100j formed on the drum cam 100 includes an inclined cam groove portion 100l, a first cam groove portion 100m, and a second cam groove portion 100n. The inclined cam groove portion 100l extends in a direction inclined with respect to the first axis C1 of the rear-wheel side output shaft 44. The first cam groove portion 100m is formed at the end portion on the side opposite the second cam groove 100k side of the inclined cam groove portion 100l, and extends in a direction perpendicular to the first axis C1. The second cam groove portion 100n is formed at the end portion on the second cam groove 100k side of the inclined cam groove portion 100l, and extends in a direction perpendicular to the direction of the first axis C1. With the first cam groove 100j, as shown in FIG. 14B for example, when the drum cam 100 is rotated in the direction of arrow F1 around the first axis C1 as the nut member 92 is rotated in the direction of arrow F1 around the first axis C1 by the electric motor 84, the first cam engaging member 160 is moved along the inclined cam groove portion 100*l* in the direction of arrow F2 by an amount of movement D1 that is greater than the amount of movement of the nut member 92 in the direction of arrow F2, from a state in which the first cam engaging member 160 is arranged in the end portion on the inclined cam groove portion 100*l* side of the first cam groove portion 100*m* of the first cam groove 100*j*, such that the first fork shaft 154 moves in the direction of arrow F2. Also, as shown in FIG. 14C, for example, when the drum cam 100 is rotated in the direction opposite the direction of arrow F1 around the first axis C1 as the nut member 92 is rotated in the direction opposite the direction of arrow F1 around the first axis C1 by the electric motor 84, the first cam engaging member 160 is moved along the inclined cam groove portion 100*l* in the direction opposite the direction of arrow F2 by the amount of movement D1 that is greater than the amount of movement of the nut member 92 in the direction opposite the direction of arrow F2, from a state in which the first cam engaging member 160 is arranged inside the second cam groove portion 100*n* of the first cam groove 100*j*, such that the first fork shaft 154 moves in the direction opposite the direction of arrow F2.

With the first cam groove 100*j*, even if the drum cam 100 is rotated in the direction of arrow F1 around the first axis C1 by the electric motor 84, such that the first cam engaging member 160 comes to be arranged in the end portion on the inclined cam groove portion 100*l* side of the first cam groove portion 100*m* as shown in FIG. 14B, from a state in which the first cam engaging member 160 is arranged inside the end portion on the side opposite the inclined cam groove portion 100*l* side of the first cam groove portion 100*m* of the first cam groove 100*j* as shown in FIG. 14A, for example, the first cam engaging member 160 will not move in the direction of arrow F2. Also, even if the drum cam 100 is rotated in the direction opposite the direction of arrow F1 around the first axis C1 by the electric motor 84, such that the first cam engaging member 160 comes to be arranged in the end portion on the side opposite the inclined cam groove portion 100*l* side of the first cam groove portion 100*m* as shown in FIG. 14A, from a state in which the first cam engaging member 160 is arranged inside the end portion on the inclined cam groove portion 100*l* side of the first cam groove portion 100*m* of the first cam groove 100*j* as shown in FIG. 14B, for example, the first cam engaging member 160 will not move in the direction opposite the direction of arrow F2.

As shown in FIG. 13, the second cam groove 100*k* formed on the drum cam 100 includes an inclined cam groove portion 100*o*, a first cam groove portion 100*p*, and a second cam groove portion 100*q*. The inclined cam groove portion 100*o* extends in a direction inclined with respect to the first axis C1 of the rear-wheel side output shaft 44. The first cam groove portion 100*p* is formed at the end portion on the first cam groove 100*j* side of the inclined cam groove portion 100*o*, and extends in a direction perpendicular to the first axis C1. The second cam groove portion 100*q* is formed at the end portion on the side opposite the first cam groove 100*j* side of the inclined cam groove portion 100*o*, and extends in a direction perpendicular to the first axis C1. With the second cam groove 100*k*, as shown in FIG. 14A, for example, when the drum cam 100 is rotated in the direction of arrow F1 around the first axis C1 as the nut member 92 is rotated in the direction of arrow F1 around the first axis C1 by the electric motor 84, the second cam engaging member 164 is moved along the inclined cam groove portion 100*o* in the direction of arrow F2 by an amount of movement D2 that is greater than the amount of movement of the nut member 92 in the direction of arrow F2, from a state in which the second cam engaging member 164 is arranged in the first cam groove portion 100*p* of the second cam groove 100*k*, such that the second fork shaft 156 moves in the direction of arrow F2. Also, as shown in FIG. 14B, for example, when the drum cam 100 is rotated in the direction opposite the direction of arrow F1 around the first axis C1 as the nut member 92 is rotated in the direction opposite the direction of arrow F1 around the first axis C1 by the electric motor 84, the second cam engaging member 164 is moved along the inclined cam groove portion 100*o* in the direction opposite the direction of arrow F2 by the amount of movement D2 that is greater than the amount of movement of the nut member 92 in the direction opposite the direction of arrow F2, from a state in which the second cam engaging member 164 is arranged inside the end portion on the inclined cam groove portion 100*o* side of the second cam groove portion 100*q* of the second cam groove 100*k*, such that the second fork shaft 156 moves in the direction opposite the direction of arrow F2.

In the second cam groove 100*k*, even if the drum cam 100 is rotated in the direction of arrow F1 around the first axis C1 by the electric motor 84, such that the second cam engaging member 164 comes to be arranged in the end portion on the side opposite the inclined cam groove portion 100*o* side of the second cam groove portion 100*q* as shown in FIG. 14C, from a state in which the second cam engaging member 164 is arranged inside the end portion on the inclined cam groove portion 100*o* side of the second cam groove portion 100*q* of the second cam groove 100*k* as shown in FIG. 14B, for example, the second cam engaging member 164 will not move in the direction of arrow F2. Also, even if the drum cam 100 is rotated in the direction opposite the direction of arrow F1 around the first axis C1 by the electric motor 84, such that the second cam engaging member 164 comes to be arranged in the end portion on the inclined cam groove portion 100*o* side of the second cam groove portion 100*q* as shown in FIG. 14B, from a state in which the second cam engaging member 164 is arranged inside the end portion on the side opposite the inclined cam groove portion 100*o* side of the second cam groove portion 100*q* of the second cam groove 100*k* as shown in FIG. 14C, for example, the second cam engaging member 164 will not move in the direction opposite the direction of arrow F2.

As shown in FIG. 13, the first cam groove 100*j* and the second cam groove 100*k* formed on the drum cam 100 are arranged in the order of the second cam groove 100*k* and the first cam groove 100*j* in the direction of arrow F1. That is, the first cam groove 100*j* and the second cam groove 100*k* are arranged with an end A1 on the side opposite the second cam groove 100*k* side of the first cam groove 100*j* offset by a predetermined angle θ from an end A2 on the first cam groove 100*j* side of the second cam groove 100*k*, as shown in FIG. 12.

FIGS. 14A to 14C are views of the first cam groove 100*j* and the second cam groove 100*k* hypothetically lined up in the direction of the first axis C1, with the second cam groove 100*k* formed on the drum cam 100 rotated a predetermined angle θ in the direction of arrow F1. That is, FIGS. 14A to 14C are views of the first cam groove 100*j* and the second cam groove 100*k* hypothetically lined up in the direction of the first axis C1, with the second cam groove 100*k* rotated such that the end A1 on the side opposite the second cam groove 100k side of the first cam groove 100j and the end A2 on the first cam groove 100j side of the second cam groove 100k are aligned in the direction of arrow F1. Of FIGS. 14A to 14C, FIG. 14A is a view showing the positions of the first cam engaging member 160 and the second cam engaging member 164 when the high-low sleeve 62 and the locking sleeve 70 are switched to the high gear (H4 or H2) position, i.e., when the drum cam 100 is rotated to the high gear (H4 or H2) position. Also, FIG. 14B is a view showing the positions of the first cam engaging member 160 and the second cam engaging member 164 when the high-low sleeve 62 and the locking sleeve 70 are switched to the H4L position, i.e., when the drum cam 100 is rotated to the H4L position. Also, FIG. 14C is a view showing the positions of the first cam engaging member 160 and the second cam engaging member 164 when the high-low sleeve 62 and the locking sleeve 70 are switched to the L4L position, i.e., when the drum cam 100 is rotated to the L4L position.

According to the transfer 150 structured as described above, when the drum cam 100 is rotated from the high gear position to the H4L position as shown in FIGS. 14A and 14B via the screw mechanism 86 by rotatably driving the electric motor 84, the locking sleeve 70 moves in the direction of arrow F2 via the second fork shaft 156 and the 4WD locking fork 168 as the second cam engaging member 164 moves in the direction of arrow F2 along the inclined cam groove portion 100o, and the meshing teeth 70a of the locking sleeve 70 mesh with the locking teeth 68. Even if the drum cam 100 rotates from the high gear position to the H4L position, the first cam engaging member 160 will move along the first cam groove portion 100m and not move in the direction of arrow F2, so the outer peripheral teeth 62b of the high-low sleeve 62 will remain in mesh with the high-side gear teeth 64. Therefore, when the drum cam 100 is rotated from the high gear position to the H4L position, the locking sleeve 70 is switched to the H4L position.

Also, when the drum cam 100 is rotated from the H4L position to the L4L position as shown in FIGS. 14B and 14C, the high-low sleeve 62 moves in the direction of arrow F2 via the first fork shaft 154 and the high-low shift fork 166 as the first cam engaging member 160 moves in the direction of arrow F2 along the inclined cam groove portion 100l, and the outer peripheral teeth 62b of the high-low sleeve 62 mesh with the low-side gear teeth 66. Even if the drum cam 100 rotates from the H4L position to the L4L position, the second cam engaging member 164 will move along the second cam groove portion 100q and not move in the direction of arrow F2, so the meshing teeth 70a of the locking sleeve 70 will remain in mesh with the locking teeth 68. Therefore, when the drum cam 100 is rotated from the H4L position to the L4L position, the high-low sleeve 62 is switched to the L4L position.

Also, when the drum cam 100 is rotated from the L4L position to the H4L position as shown in FIGS. 14C and 14B, the high-low sleeve 62 moves in the direction opposite the direction of arrow F2 via the first fork shaft 154 and the high-low shift fork 166 as the first cam engaging member 160 moves in the direction opposite the direction of arrow F2 along the inclined cam groove portion 100l, and the outer peripheral teeth 62b of the high-low sleeve 62 mesh with the high-side gear teeth 64. Even if the drum cam 100 rotates from the L4L position to the H4L position, the second cam engaging member 164 will move along the second cam groove portion 100q and will not move in the direction opposite the direction of arrow F2, so the meshing teeth 70a of the locking sleeve 70 will remain in mesh with the locking teeth 68. Therefore, when the drum cam 100 is rotated from the L4L position to the H4L position, the high-low sleeve 62 is switched to the H4L position.

Also, when the drum cam 100 is rotated from the H4L position to the high gear position as shown in FIGS. 14B and 14A, the locking sleeve 70 moves in the direction opposite the direction of arrow F2 via the second fork shaft 156 and the 4WD locking fork 168 as the second cam engaging member 164 moves in the direction opposite the direction of arrow F2 along the inclined cam groove portion 100o, and the meshing teeth 70a of the locking sleeve 70 move away from and come out of mesh with the locking teeth 68. Even if the drum cam 100 rotates from the H4L position to the high gear position, the first cam engaging member 160 will move along the first cam groove portion 100m and will not move in the direction opposite the direction of arrow F2, so the outer peripheral teeth 62b of the high-low sleeve 62 will remain in mesh with the high-side gear teeth 64. Therefore, when the drum cam 100 is rotated from the H4L position to the high gear position, the high-low sleeve 62 and the locking sleeve 70 are switched to the high gear position.

Heretofore, example embodiments have been described in detail with reference to the drawings, but other embodiments are possible.

For example, in the first example embodiment described above, in the screw mechanism 86, the nut member 92 is moved in the direction of the first axis C1 of the rear-wheel side output shaft 44 by the nut member 92 being rotatably driven by the electric motor 84, but the structure of the screw mechanism 86 may also be modified such that the nut member 92 is moved in the direction of the first axis C1 of the rear-wheel side output shaft 44 by the threaded shaft member 94 being rotatably driven by the electric motor 84, for example. When the threaded shaft member 94 is rotatably driven by the electric motor 84 in this way, the nut member 92 is supported by a case or the like in a manner able to move in the direction of the first axis C1 of the rear-wheel side output shaft 44 and unable to rotate around the first axis C1, and the threaded shaft member 94 is supported by the rear-wheel side output shaft 44 in a manner unable to move in the direction of the first axis C1 of the rear-wheel side output shaft 44 and able to rotate around the first axis C1 of the rear-wheel side output shaft 44. Also, the drum cam 100 is connected to the threaded shaft member 94. Therefore, when the threaded shaft member 94 is rotatably driven by the electric motor 84, the nut member 92 moves in the direction of the first axis C1 of the rear-wheel side output shaft 44 and the linear motion of the nut member 92 is transmitted to the front-wheel drive clutch 50 via the first transmitting mechanism 88b. Moreover, when the threaded shaft member 94 is rotatably driven by the electric motor 84, the drum cam 100 that is connected to the threaded shaft member 94 rotates and the cam engaging member 103 that is engaged with the cam groove 100c moves in the direction of the third axis C3 of the fork shaft 102, and the linear motion of the cam engaging member 103, i.e., the linear motion of the fork shaft 102, is alternately transmitted to the high-low switching mechanism 48 and the 4WD locking mechanism 58 via the first moving mechanism 88e and the second moving mechanism 88f.

Also, in the first example embodiment described above, the one end portion 111a and the other end portion 111b of the first interlocking member 111 and the one end portion 115a and the other end portion 115b of the second interlocking member 115 have spherical shapes, but the shaft portion 111c of the first interlocking member 111 and a shaft portion 115c of the second interlocking member 115 may have quadrangular prism shapes, and the one end portion 111a and the other end portion 111b of the shaft portion 111c of the first interlocking member 111 and the one end portion 115a and the other end portion 115b of the shaft portion 115c of the second interlocking member 115 may be formed in partial circular cylindrical-shaped convex curves, for example. Also, the one end portion 111a and the other end portion 111b of the first interlocking member 111 and the one end portion 115a and the other end portion 115b of the second interlocking member 115 may have shapes in which pairs of flat inclined surfaces are formed. That is, as long as thrust in a direction toward the fixed shaft 109 is able to be generated in the one end portions 111a and 115a on the fork shaft 102 side of the interlocking members (the first interlocking member 111 and the second interlocking member 115) when the fork shaft 102 moves and these one end portions 111a and 115a abut against the open end portions of the recessed portions (the first recessed portion 102a and the second recessed portion 102b) of the fork shaft 102, and thrust in a direction toward the fork shaft 102 is able to be generated in the other end portions 111b and 115b on the fixed shaft 109 side of the interlocking members (the first interlocking member 111 and the second interlocking member 115) when these other end portions 111b and 115b abut against the open end portions of the recessed portions (the first recessed portion 109a and the second recessed portion 109b) of the fixed shaft 109, the shapes of the one end portion 111a and the other end portion 111b of the first interlocking member 111, the shapes of the one end portion 115a and the other end portion 115b of the second interlocking member 115, the shapes of the first recessed portion 102a and the second recessed portion 102b recessed on the fork shaft 102, and the shapes of the first recessed portion 109a and the second recessed portion 109b recessed on the fixed shaft 109, may be any shape. For example, the first interlocking member 111 and the second interlocking member 115 may have spherical shapes.

Also, in the first example embodiment described above, a ball screw is given as an example of the screw mechanism 86, but the screw mechanism 86 is not limited to this. For example, as long as the screw mechanism 86 is a conversion mechanism that converts the rotational motion of the electric motor 84 into linear motion, the screw mechanism 86 may also be a simple mechanism such as a combination of the threaded shaft member 94 and the nut member 92 that directly screw together, for example. More specifically, the screw mechanism 86 may be a slip screw or the like. When the screw mechanism 86 is a slip screw, the mechanical efficiency with which rotational motion is converted into linear motion is lower than it is with a ball screw, but certain effects, such as that high thrust is able to be applied to the front-wheel drive clutch 50, and the stroke necessary to operate the high-low switching mechanism 48 is able to be obtained, are able to be obtained.

Also, in the first example embodiment described above, the screw mechanism 86 is indirectly connected to the electric motor 84 via the worm gear 90, but the screw mechanism 86 is not limited to this. For example, the nut member 92 of the screw mechanism 86 and the electric motor 84 may be directly connected without using the worm gear 90. More specifically, the nut member 92 and the electric motor 84 may be directly connected such that a pinion provided on the motor shaft of the electric motor 84 meshes with gear teeth formed on the nut member 92.

Further, in the first example embodiment described above, an FR-based four-wheel drive vehicle is given as an example of the vehicle 10 to which the transfer 22 is applied, but the vehicle 10 to which the transfer 22 is applied is not limited to this. For example, the vehicle 10 to which the transfer 22 is applied may also be a front engine front wheel drive (FF)-based four-wheel drive vehicle. Also, the front-wheel drive clutch 50 is described as being a multiple disc clutch, but the invention may also be applied when the front-wheel drive clutch 50 is a single disc clutch.

Further, in the first example embodiment described above, an internal combustion engine such as a gasoline engine or a diesel engine, for example, may be used as the engine 12 that given as an example of the driving force source. Also, another prime mover such as an electric motor, for example, may be used either alone or in combination with the engine 12, as the driving force source. Further, the transmission 20 is any one of a variety of automatic transmissions such as a planetary gear-type stepped transmission, a continuously variable transmission (CVT), or a synchronous mesh twin shaft parallel axis-type automatic transmission (including a known DCT), or a known manual transmission. Also, the front-side clutch 36 is described as being an electromagnetic dog clutch, but the front-side clutch 36 is not limited to this. For example, the front-side clutch 36 may also be a type of friction clutch, or a dog clutch that is provided with a shift fork that moves the sleeve in the axial direction, in which the shift fork is driven by an electrically controllable or hydraulically controllable actuator, or the like.

The example embodiments described above are no more than example embodiments. Various modifications are possible based on the knowledge of one skilled in the art.

What is claimed is:

1. A transfer for a four-wheel drive vehicle, the transfer comprising:
   an input shaft;
   an output shaft having a common axis with the input shaft;
   a high-low switching mechanism configured to change a rate of rotation input from the input shaft and transmit the resultant rotation to the output shaft by a motion of a high-low sleeve in an axial direction of the out-put shaft, the high low switching mechanism being connected to the input shaft;
   an output member configured to output power to a second output destination that is different from a first output destination of the output shaft;
   a clutch configured to adjust and transmit some of the power from the output shaft to the output member;
   a locking sleeve configured to move in the axial direction of the output shaft, the locking sleeve supported by the output shaft in a manner so that the locking sleeve is unable to rotate around the axis of the output shaft relative to the output shaft, the locking sleeve configured to selectively engage with the output member so that the output shaft and the output member lock together;
   a screw mechanism that includes a threaded shaft member, a nut member, and an electric motor, the threaded shaft member and the nut member being supported by the output shaft and being screwed together, the electric motor configured to rotatably drive one of the threaded shaft member and the nut member so that the nut member moves linearly in the axial direction of the output shaft;
   a transmitting mechanism configured to transmit the linear motion of the nut member to the clutch;
   a drum cam configured to convert a rotational motion of the electric motor into a linear motion in the axial direction of the out-put shaft; and
   a switching mechanism configured to selectively switch the high-low sleeve and the locking sleeve between an H4L position and an L4L position, by transmitting the linear motion converted by the drum cam to the high low-sleeve and the locking sleeve via a high-low shift fork and a 4WD locking fork respectively, in conjunction with rotational motion of the electric motor, the H4L position being (i) a position in which the high-low sleeve provided in the high-low switching mechanism is in a position in which a high-speed gear is established in the high-low switching mechanism, and (ii) the locking sleeve is in a position in which the output shaft and the output member are locked together, the L4L position being (1) a position in which the high-low sleeve provided in the high-low switching mechanism is in a position in which a low-speed gear is established in the high-low switching mechanism, and (2) the locking sleeve is in the position in which the output shaft and the output member are locked together.

2. The transfer according to claim 1, further comprising:
a second shaft that is arranged parallel to the output shaft, the second shaft being configured to move in an axial direction of the second shaft, wherein
the high-low shift fork and the 4WD locking fork are configured to alternately engage the second shaft, the switching mechanism is configured to transmit a motion of the second shaft in an axial direction to the high-low sleeve and the locking sleeve via the high-low shift fork and the 4WD locking fork respectively.

3. The transfer according to claim 2, wherein
the switching mechanism includes a fixed shaft, a first stopper, and a second stopper, the fixed shaft is arranged parallel to the second shaft,
the high-low shift fork has a first pair of through-holes through which the second shaft and the fixed shaft pass so that the high-low shift fork moves in the axial direction of the second shaft and the fixed shaft,
the high-low shift fork has a first communication hole that communicates between the first pair of through-holes,
a first interlocking member is arranged inside the first communication hole, the first interlocking member is configured to move in an axial direction of the first communication hole so that a first end portion of the first interlocking member selectively engages with a recessed portion on the second shaft, and a second end portion of the first interlocking member selectively engages with a recessed portion on the fixed shaft,
the 4WD locking fork has a second pair of through-holes through which the second shaft and the fixed shaft pass so that the 4WD locking fork moves in the axial direction of the second shaft and the fixed shaft, the 4WD locking fork has a second communication hole that communicates between the second pair of communication holes,
a second interlocking member is arranged inside the second communication hole, the second interlocking member is configured to move in an axial direction of the second communication hole so that a first end portion of the second interlocking member selectively engages with a recessed portion on the second shaft, and a second end portion of the second interlocking member selectively engages with a recessed portion on the fixed shaft,
the first stopper is arranged on the second shaft, the first stopper is configured to selectively move the high-low shift fork in the axial direction by the movement of the second shaft in the axial direction of the second shaft,
the second stopper is arranged on the second shaft, the second stopper is configured to selectively move the 4WD locking fork in the axial direction by the movement of the second shaft in the axial direction of the second shaft, and
the switching mechanism is configured to alternately engage the second shaft and the high-low shift fork, and the second shaft and the 4WD locking fork, by the first stopper, the second stopper, the first interlocking member, and the second interlocking member so that the movement of the second shaft is alternately transmitted to the high-low shift fork or the 4WD locking fork.

4. The transfer according to claim 1, further comprising:
a second shaft that is arranged parallel to the output shaft, the second shaft being configured to move in an axial direction of the second shaft; and
a third shaft that is arranged parallel to the output shaft, the third shaft being configured to move in an axial direction of the second shaft, wherein
the high-low shift fork is connected to the second shaft, the 4WD locking fork is connected to the third shaft, the switching mechanism is configured to transmit a motion of the second shaft in an axial direction to the high-low sleeve via the high-low shift fork, and the switching mechanism is configured to transmit a motion of the third shaft in an axial direction to the locking sleeve via the 4WD locking fork.

5. The transfer according to claim 1, wherein an output shaft support bearing that rotatably supports an end portion of the output shaft on the drum cam side, is arranged inside the drum cam within a length range of the drum cam in the axial direction of the output shaft.

6. The transfer according to claim 1, wherein
a cam engaging member is connected to the second shaft, the drum cam has a cam groove that engages with the cam engaging member, the cam groove is configured to move the cam engaging member in the axial direction of the second shaft by the drum cam that is connected to one of the threaded shaft member and the nut member and rotates around the axis of the output shaft, and
the cam groove has an inclined cam groove portion that extends in a direction inclined with respect to the axis of the output shaft such that an amount of movement in the axial direction of the second shaft by the rotation of the drum cam is greater than an amount of movement of the nut member in the axial direction of the output shaft by the rotation of one of the threaded shaft member and the nut member.

7. The transfer according to claim 1, wherein the nut member screws together with the threaded shaft member via a plurality of balls located between the nut member and the threaded shaft member.

8. The transfer according to claim 6, wherein the cam engaging member transmits the movement of the cam engaging member that is in the axial direction of the output shaft to the second shaft via a spring member.

* * * * *